United States Patent
Kamata et al.

(10) Patent No.: US 6,700,578 B2
(45) Date of Patent: Mar. 2, 2004

(54) THREE-DIMENSIONAL MODEL DISPLAY PROGRAM AND THREE-DIMENSIONAL MODEL DISPLAY APPARATUS

(75) Inventors: Seiichi Kamata, Kawasaki (JP); Fujio Sato, Kawasaki (JP); Yukio Hirayama, Kawasaki (JP); Keisuke Imaizumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 313 days.

(21) Appl. No.: 09/983,941

(22) Filed: Oct. 26, 2001

(65) Prior Publication Data

US 2002/0186217 A1 Dec. 12, 2002

(30) Foreign Application Priority Data

Jun. 7, 2001 (JP) .......................................... 2001-171867

(51) Int. Cl.⁷ ............................................... G06T 15/00
(52) U.S. Cl. ....................................................... 345/473
(58) Field of Search ................................. 345/473, 474, 345/475, 419, 427, 428, 619

(56) References Cited

U.S. PATENT DOCUMENTS 5,574,836 A  * 11/1996 Broemmelsiek ............ 345/427
6,234,901 B1 * 5/2001 Nagoshi et al. ............... 463/33
6,323,895 B1 * 11/2001 Sata ............................ 348/39

* cited by examiner

Primary Examiner—Phu K. Nguyen
(74) Attorney, Agent, or Firm—Staas & Halsey LLP

(57) ABSTRACT

There are provided a three-dimensional model display program and a three-dimensional model display apparatus, which enable seamless switching between two-point perspective projection and three-point perspective projection. A line-of-sight vector indicative of a direction of viewing an inside of a virtual three-dimensional space from a viewpoint 3 is determined in response to an operation input. A projection condition is determined that two-point perspective projection is selected when the line-of-sight vector is close to a horizontal one and that a degree of influence of three-point perspective projection on two-point perspective projection increases with an increase in inclination of the line-of-sight vector with respect to a horizontal direction. An image is generated by perspectively projecting the three-dimensional model 2 according to the determined projection condition, and then the generated image is displayed.

12 Claims, 23 Drawing Sheets

$$Sn3 = V - \{U\cos\theta \times \underline{(1 - |\cos\theta|)}\}$$
$$\phantom{Sn3 = V - \{U\cos\theta \times }\text{WALK TERM}$$

111 VIEW FIELD INFORMATION STORAGE SECTION

| | |
|---|---|
| VIEWPOINT COORDINATES E | (Ex,Ey,Ez) |
| LINE-OF-SIGHT VECTOR V | (Vx,Vy,Vz) |
| UP VECTOR U | (Ux,Uy,Uz) |
| DISTANCE FROM VIEWPOINT TO PROJECTION PLANE | d |
| PROJECTION PLANE NORMAL VECTOR Sn | (Sx,Sy,Sz) |
| WINDOW SIZE | Wx,Wy |
| IMAGE-FORMING MODE | WALK PERSPECTIVE PROJECTION |

FIG. 9

112 THREE-DIMENSIONAL MODEL INFORMATION STORAGE SECTION

| | | |
|---|---|---|
| SHAPE INFORMATION | VERTEX COORDINATES P | P1(P1x,P1y,P1z) |
| | | P2(P2x,P2y,P2z) |
| | | ⋮ |
| | NORMAL VECTORS N | N1(N1x,N1y,N1z) |
| | | N2(N2x,N2y,N2z) |
| | | ⋮ |
| | FACE INFORMATION | P1,P2,P3,P4 |
| | | P3,P4,P5,P6 |
| | | ⋮ |
| COLOR INFORMATION | MODEL COLOR | Mr,Mg,Mb |
| | MODEL TRANSLUCENCY RATIO | $\alpha$ |
| | LIGHT SOURCE COLOR | Lr,Lg,Lb |
| | LIGHT SOURCE POSITION L | (Lx,Ly,Lz) |

FIG. 10

TWO-POINT PERSPECTIVE
PROJECTION

THREE-POINT PERSPECTIVE
PROJECTION

THREE-DIMENSIONAL MODEL DISPLAY PROGRAM AND THREE-DIMENSIONAL MODEL DISPLAY APPARATUS

BACKGROUND OF THE INVENTION

1. Field of the Invention

The present invention relates to a three-dimensional model display program and apparatus for displaying a three-dimensional model within a virtual three-dimensional space, and more particularly to a three-dimensional model display program and apparatus which are capable of turning a line-of-sight vector upward and downward.

2. Description of the Related Art

In recent years, the technique of displaying a three-dimensional model on a computer has been utilized in a lot of technical fields. For example, after a building is designed, a three-dimensional model representing the building is generated for display on a computer screen. This three-dimensional representation of the building enables the appearance of the building to be easily grasped. Further, if a viewpoint for displaying the three-dimensional model can be moved in response to user command, it is possible to display the three-dimensional model of the building from any desired viewpoint.

When it is required to display a three-dimensional model on a two-dimensional plane of a computer, projection processing is applied to the three-dimensional model. The projection processing is broadly classified into perspective projection and parallel projection. In displaying a moving image, perspective projection is generally used.

Perspective projection is characterized by utilizing perspective foreshortening and vanishing points. Perspective foreshortening is a phenomenon that when a line segment having a predetermined length is projected onto a two-dimensional plane, as the distance between the line segment and a viewpoint increases, the length of the line segment on the two-dimensional plane is reduced. A vanishing point is a point within a two-dimensional plane, to which converge two projected straight lines which are parallel with each other in the three-dimensional space.

Projection processing differs depending on the number of vanishing points. Projection processing performed with two vanishing points is called "two-point perspective projection", and projection processing performed with three vanishing points is referred to as "three-point perspective projection". Two-point perspective projection is mainly employed when it is desired to give a sense of expansion of a building or the like in a horizontal direction, while three-point perspective projection is mainly employed when it is desired to give a sense of height of a building or the like.

FIGS. 23(A) and 23(B) are views of examples of representation by conventional perspective projection methods, in which FIG. 23(A) shows an example of an image displayed by two-point perspective projection, while FIG. 23(B) shows an example of an image displayed by three-point perspective projection.

As shown in FIG. 23(A), in two-point perspective projection, there are defined two vanishing points VP1, VP2. In this case, extensions of horizontally-extending line segments of a three-dimensional model 301 converge to either of the vanishing points VP1, VP2.

On the other hand, as shown in FIG. 23(B), in three-point perspective projection, there are defined three vanishing points VP3, VP4, VP5. In this case, extensions of horizontally-extending line segments of a three-dimensional model 302 converge to either of the vanishing points VP3, VP4, and extensions of vertically-extending line segments of the three-dimensional model 302 converge to the vanishing point VP5.

As described above, two-point perspective projection and three-point perspective projection are clearly distinguished from each other, and they are different in their applications. To generate a still image, one of the projection methods may be used which is more suitable for a scene to be displayed.

However, in generating a moving image, different scenes are required to be sequentially displayed, so that whichever projection method may be adopted, some scenes are inevitably displayed improperly.

For example, in viewpoint movement called walkthrough, it is necessary to seamlessly switch the direction of viewing from a viewpoint between a horizontal one to a vertical one. In such a case, if only one of the projection methods is employed, the formed image fails to give either a sense of lateral expansion or a sense of height. Further, if one projection method is alternately switched to the other during viewpoint movement, continuity of images cannot be maintained, which results in an unnatural moving image sequence.

SUMMARY OF THE INVENTION

It is an object of the invention to provide a three-dimensional model display program and a three-dimensional model display apparatus for displaying a three-dimensional model within a virtual three-dimensional space, which enable seamless switching between two-point perspective projection and three-point perspective projection.

To attain the above object, according to a first aspect of the invention, there is provided a three-dimensional model display program for displaying a three-dimensional model defined within a virtual three-dimensional space. This three-dimensional model display program is characterized by causing a computer to execute the processes of determining a line-of-sight vector indicative of a direction of viewing an inside of the virtual three-dimensional space from a viewpoint, in response to an operation input, determining a projection condition that two-point perspective projection is selected when the line-of-sight vector is close to a horizontal one, and a degree of influence of three-point perspective projection on two-point perspective projection increases with an increase in inclination of the line-of-sight vector with respect to a horizontal direction, generating an image by perspectively projecting the three-dimensional model according to the determined projection condition, and displaying the generated image.

To attain the above object, according to a second aspect of the invention, there is provided a three-dimensional model display apparatus for displaying a three-dimensional model defined within a virtual three-dimensional space. This three-dimensional model display apparatus is characterized by comprising viewpoint status-determining means for determining a line-of-sight vector indicative of a direction of viewing an inside of the virtual three-dimensional space from a viewpoint, in response to an operation input, projection condition-determining means for determining a projection condition that two-point perspective projection is selected when the line-of-sight vector determined by the viewpoint status-determining means is close to a horizontal one and a degree of influence of three-point perspective projection on two-point perspective projection increases with an increase in inclination of the line-of-sight vector with respect to a horizontal direction, image-generating means for generating an image by perspectively projecting the three-dimensional model according to the projection condition determined by the projection condition-determining means, and image display means for displaying the generated image.

The above and other objects, features and advantages of the present invention will become apparent from the following description when taken in conjunction with the accompanying drawings which illustrate a preferred embodiment of the present invention by way of example.

BRIEF DESCRIPTION OF THE DRAWINGS

FIGS. 6(A) to 6(C) are views useful in explaining differences between projection images generated by the respective perspective projection methods, in which:

FIG. 6(A) shows projection images generated by two-point perspective projection;

FIG. 6(B) shows projection images generated by three-point perspective projection; and FIG. 6(C) shows projection images generated by walk perspective projection;

FIG. 9 shows an example of a data structure of data stored in a view field information storage section;

FIG. 10 shows an example of a data structure of data stored in a three-dimensional model information storage section;

FIGS. 23(A) and 23(B) are views of images generated by conventional perspective projection methods, in which:

FIG. 23(A) shows an example of an image generated by two-point perspective projection; and FIG. 23(B) shows an example of an image generated by three-point perspective projection.

DESCRIPTION OF THE PREFERRED EMBODIMENT

The invention will now be described in detail with reference to drawings showing a preferred embodiment thereof.

Figure 1:
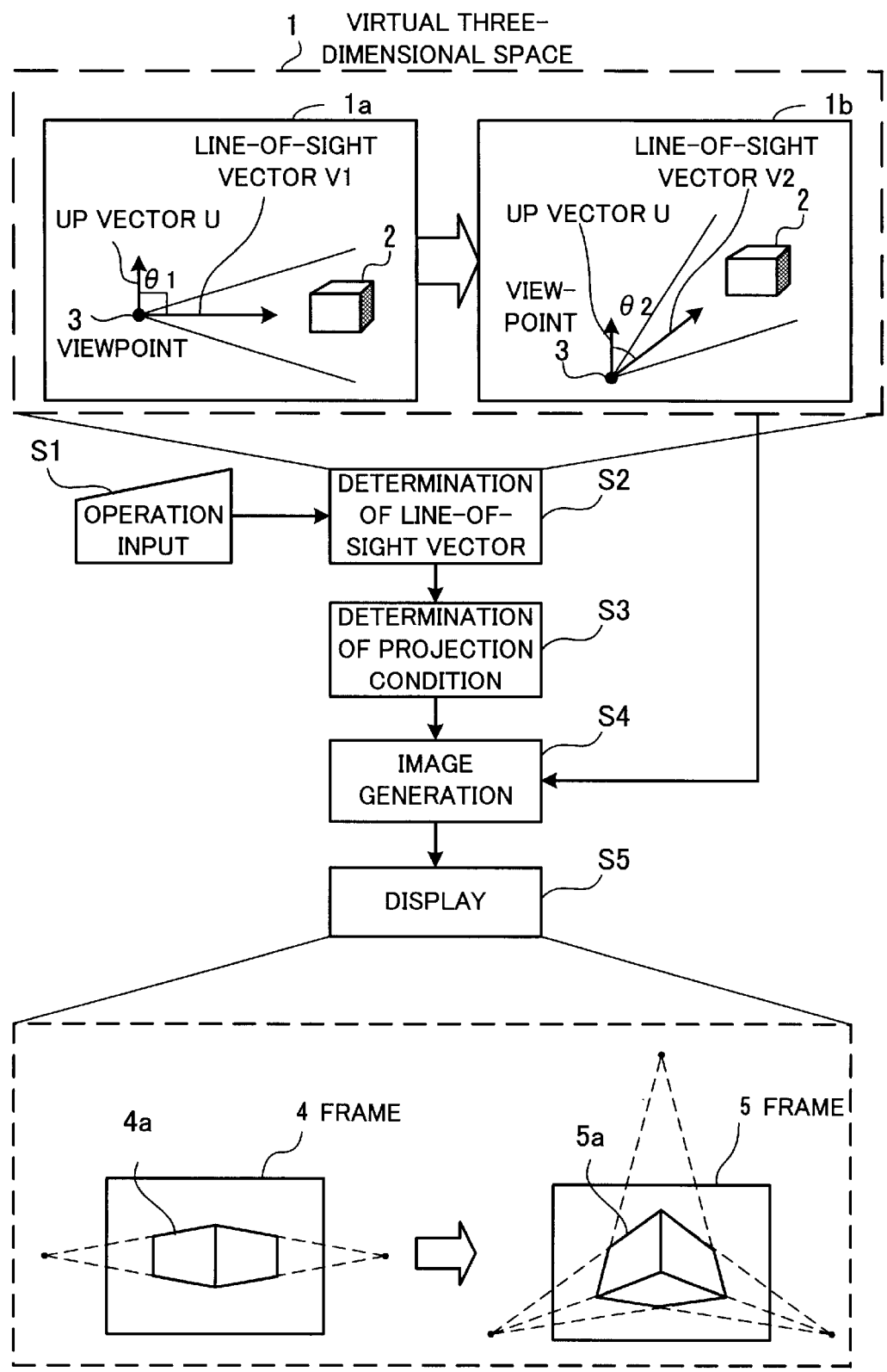
FIG. 1 is a conceptual representation showing principles of the present invention.

Referring first to FIG. 1, description is given of the principles of the invention. The invention is directed to a method of displaying an image of a three-dimensional model 2 defined within a virtual three-dimensional space 1. The image is displayed as a moving image sequence which represents the inside of the virtual three-dimensional space 1 from a viewpoint 3 moving e.g. in response to user command.

In the present invention, when input by user's operation is performed (S1), a line-of-sight vector indicative of a direction of viewing the inside of the virtual three-dimensional space 1 from the viewpoint, as indicated by V1, V2, is determined in response to the input (S2). When the line-of-sight vector is determined, a projection condition is determined (S3) such that when the line-of-sight vector is directed substantially horizontally, two-point perspective projection is selected, and the degree of influence of three-point perspective projection on two-point perspective projection is increased with an increase in the inclination of the line-of-sight vector with respect to the horizontal direction. Further, the three-dimensional model 2 is perspectively projected according to the determined projection condition to thereby generate an image (S4), and then the generated image is displayed (S5).

In the example illustrated in FIG. 1, in response to the input by use's operation (hereinafter referred to as "operation input") (S1), a state of viewing the three-dimensional model 2 from the viewpoint 3 in a horizontal direction within the virtual three-dimensional space 1 is changed to a state of viewing the three-dimensional model 2 from the viewpoint 3 in an upward direction. In the figure, an up vector U indicates a vector directed vertically upward from the viewpoint 3. The up vector U is assumed to be always directed to the point directly above the viewpoint 3 within the virtual three-dimensional space 1.

In an initial scene 1a of the virtual three-dimensional space 1, an angle θ1 between the line-of-sight vector V1 and the up vector U is assumed to be 90 degrees. In other words, the line-of-sight vector Vi is directed horizontally within the virtual three-dimensional space 1. From this state, the viewpoint 3 is moved by the operation input to a position where the three-dimensional model 2 is viewed in the upward direction. In a scene 1b of the virtual three-dimensional space 1 after the shift of the viewpoint 3, an angle θ2 between the line-of-sight vector V2 and the up vector U is an acute angle (smaller than 90 degrees).

In the scene 1a, when the line-of-sight vector is determined, a projection condition is determined according to the direction of the line-of-sight vector. Since the line-of-sight vector V1 in the scene 1a is directed horizontally, a projection condition for two-point perspective projection is set, and then the perspective projection is performed to generate an image. Subsequently, as shown in a frame 4, a perspective image 4a of the three-dimensional model 2 by two-point perspective projection is displayed based on the generated image.

In the scene 1b as well, when the line-of-sight vector is determined, a projection condition is determined according to the direction of the line-of-sight vector. Since the line-of-sight vector V2 in the scene 1b is directed upward with respect to the horizontal direction, a projection condition with influence of three-point perspective projection is set, and then the perspective projection is performed according to the projection condition to generate an image. Subsequently, as shown in a frame 5, a perspective image 5a of the three-dimensional model 2 influenced by three-point perspective projection is displayed based on the generated image.

Thus, it is possible to cause seamless transition between two-point perspective projection and three-point perspective projection.

One of the methods for changing the degree of influence of three-point perspective projection on two-point perspective projection is to change the direction of the normal of a projection plane (projection plane normal) For instance, by determining the direction of the normal of the projection plane according to the direction of the determined line-of-sight vector, it is possible to change the degree of influence of three-point perspective projection.

In the following, description will be given of the three-dimensional model display apparatus according to an embodiment of the invention for realizing seamless transition between two-point perspective projection and three-point perspective projection by changing the direction of a projection plane normal according to the direction of the line-of-sight vector.

First, methods of realizing two-point perspective projection and three-point perspective projection by using a computer will be described prior to detailed description of the present embodiment.

Two-point perspective projection can be realized by defining a projection plane as a vertical plane.

Figure 2:
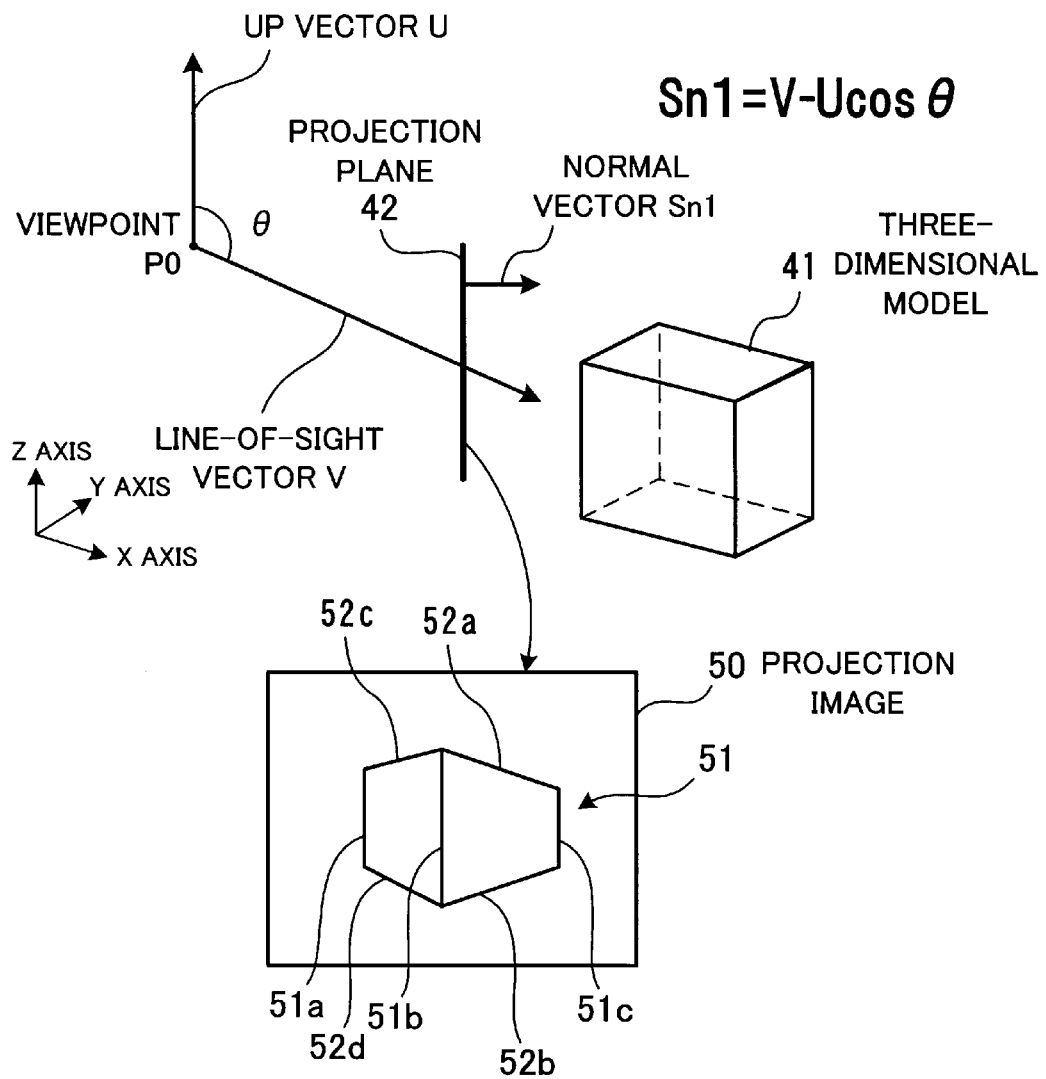
FIG. 2 is a conceptual representation showing a method of realizing two-point perspective projection.

FIG. 2 is a conceptual representation of the method of realizing two-point perspective projection. In the illustrated example, a viewpoint PO and a three-dimensional model 41 are set in a virtual three-dimensional space. The virtual three-dimensional space is represented by an X axis, a Y axis and a Z axis. The X and Y axes are defined to extend in respective horizontal directions within the virtual three-dimensional space, while the Z axis is defined to extend in a vertical direction within the same.

Further, an up vector U and a line-of-sight vector V are defined with respect to the viewpoint P0. The up vector U is a unit vector directed from the viewpoint P0 in an upward direction which is used in expressing the three-dimensional model 41 as viewed from the viewpoint P0. In the present embodiment, the up vector U is fixedly set in the vertical direction within the virtual three-dimensional space.

The line-of-sight vector V is a unit vector directed from the viewpoint P0 toward an arbitrary point (point of regard) within the virtual three-dimensional space. In the case of displaying the three-dimensional model 41, for example, a point on the three-dimensional model 41 is set to the point of regard.

In two-point perspective projection, a projection plane 42 is set as a vertical plane, irrespective of the direction of the line-of-sight vector V. That is, the normal of the projection plane 42 is directed horizontally in the virtual three-dimensional space.

A normal vector Sn1 of the projection plane 42 is determined by the following equation (1):

$$Sn1 = V - U \cos \theta \tag{1}$$

wherein θ represents an angle formed by the line-of-sight vector V and the up vector U. The vector U cos θ has the same length as the vertical component of the line-of-sight vector V and directed vertically in the virtual three-dimensional space. Therefore, the vector U cos θ is hereinafter referred to as "the vertical vector". In other words, a horizontal vector is determined by subtracting the vertical vector from the line-of-sight vector V.

It should be noted that in the illustrated example, the three-dimensional model 41 is assumed to be a rectangular parallelepiped placed on the X-Y plane. In other words, each of the edges of faces forming the three-dimensional model 41 is a vertical or horizontal line segment.

The three-dimensional model 41 is perspectively projected onto the projection plane 42 whose orientation is defined by the normal vector Sn1, whereby a projection image 50 generated by two-point perspective projection is obtained.

In the projection image 50, there is formed an image 51 of the three-dimensional model 41 as viewed from the viewpoint P0. The image 51 has its shape expressed by line segments 51a to 51c and 52a to 52d representative of respective edges of the three-dimensional model 41. The vertical line segments 51a to 51c are held in parallel with each other. On the other hand, the lateral line segments 52a, 52b are formed such that extensions thereof converge to one predetermined vanishing point. Similarly, the lateral line segments 52c, 52d are formed such that extensions thereof converge to the other predetermined vanishing point.

On the other hand, three-point perspective projection can be realized by tilting a projection plane with respect to the vertical direction.

Figure 3:
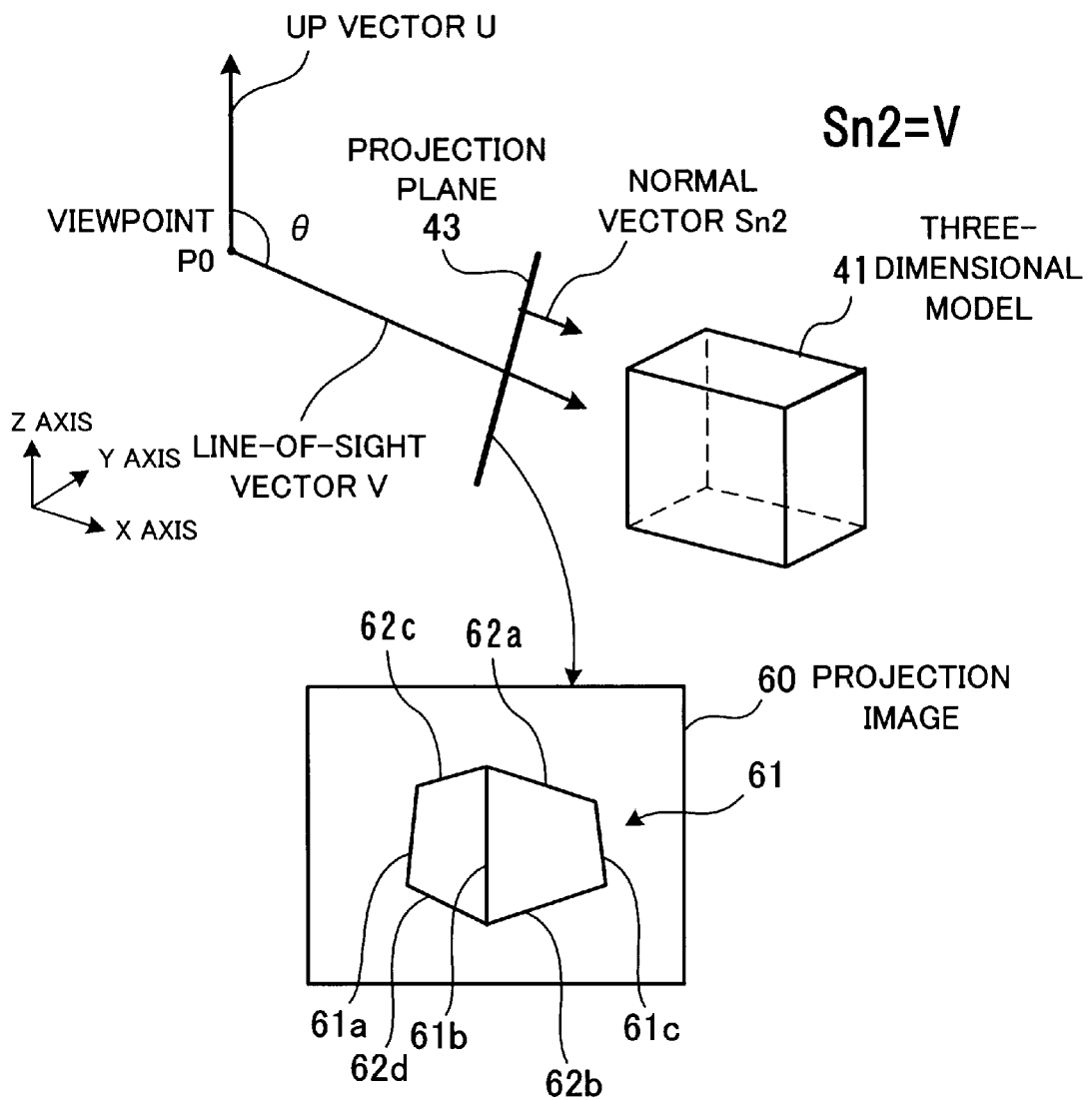
FIG. 3 is a conceptual representation showing a method of realizing three-point perspective projection.

FIG. 3 is a conceptual representation of the method of realizing three-point perspective projection. A viewpoint P0, a three-dimensional model 41, an up vector U and a line-of-sight vector V in the figure are similar to those in FIG. 2.

In three-point perspective projection, a normal vector Sn2 of a projection plane 43 is determined by the following equation (2):

$$Sn2 = V \tag{2}$$

The three-dimensional model 41 is perspectively projected onto the projection plane 43 whose orientation is defined by the normal vector Sn2, whereby a projection image 60 generated by three-point perspective projection is obtained.

In the projection image 60, there is formed an image 61 of the three-dimensional model 41 as viewed from the viewpoint P0.

The image 61 has its shape expressed by line segments 61a to 61c and 62a to 62d representative of respective edges of the three-dimensional model 41. The vertical line segments 61a to 61c are formed such that extensions thereof converge to a first vanishing point set far above. On the other hand, the lateral line segments 62a, 62b are formed such that extensions thereof converge to a second vanishing point set in the virtual three-dimensional space. Similarly, the lateral line segments 62c, 62d are formed such that extensions thereof converge to a third vanishing point set in the virtual three-dimensional space.

Two-point perspective projection and three-point perspective projection are thus realized. According to the present embodiment, there is provided a projection method which enables seamless transition between two-point perspective projection and three-point perspective projection. This projection method is hereinafter referred to as walk perspective projection.

In walk perspective projection, the degree of inclination of a projection plane is calculated from an inclination of the line-of-sight vector V with respect to the horizontal direction, whereby seamless transition from two-point perspective projection to three-point perspective projection is realized.

Figure 4:
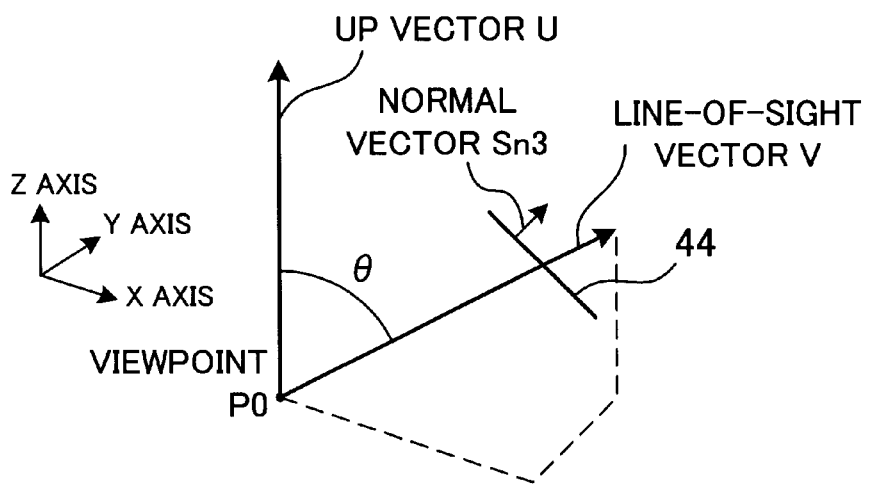
FIG. 4 is a conceptual representation showing a method of realizing walk perspective projection.

FIG. 4 is a conceptual representation of the method of realizing walk perspective projection. A viewpoint P0, an up vector U and a line-of-sight vector V in the figure are similar to those in FIG. 2.

In walk perspective projection, a normal vector Sn3 of a projection plane 44 is determined by the following equation (3):

$$Sn3 = V - \{U \cos \theta \times (1 - |\cos \theta|)\} \quad (3)$$

The term $(1-|\cos \theta|)$ of the equation (3) is hereinafter referred to as "the walk term". The equation (3) is formed by multiplying the right-side second term (vertical vector) of the equation (1) for two-point perspective projection by the walk term whose value varies with the direction of the line-of-sight vector.

As the angle $\theta$ becomes closer to 90 degrees, the value of the walk term becomes closer to 1. When the value of the walk term becomes equal to 1, the value of the right-side second term of the equation (3) becomes equal to $U \cos \theta$ (vertical vector). As a result, $Sn3 = V - U \cos \theta$ holds, which means that the equation (3) becomes equal to the equation (1) for two-point perspective projection.

As the angle $\theta$ becomes closer to 0, the value of the walk term also becomes closer to 0. When the value of the walk term becomes equal to 0, the value of the right-side second term of the equation (3) becomes equal to 0. As a result, $Sn3 = V$ holds, which means that the equation (3) becomes equal to the equation (2) for three-point perspective projection.

As is apparent from the above description, the walk term represents the degree of influence of three-point perspective projection on two-point perspective projection.

Thus, by providing the walk term, it is possible to change the inclination of the projection plane 44 gently from the vertical state within the virtual three-dimensional space (i.e. setting for two-point perspective projection) to the state perpendicular to the line-of-sight vector V (i.e. setting for three-point perspective projection) when the value of the angle $\theta$ changes from 90 degrees (indicating that the line-of-sight vector V is directed horizontally) to 0 degree (indicating that the line-of-sight vector V is directed vertically).

The vector "$U \cos \theta \times (1-|\cos \theta|)$" whose length varies with a change in the value of the walk term is hereinafter referred to as "the adjustment vector".

Figure 5:
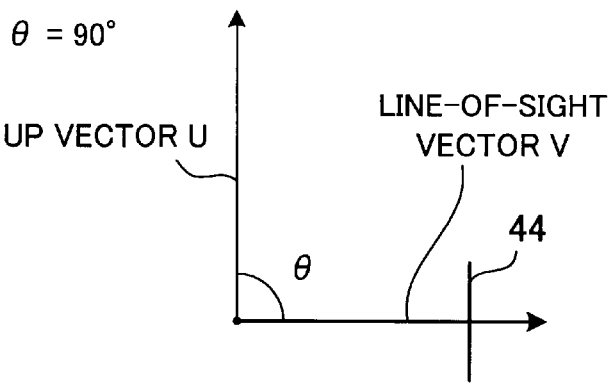
FIG. 5(A) shows an example of orientation of a projection plane in the case of an angle θ indicative of transition of the direction of a normal of a projection plane (projection plane normal) being 90 degrees.
FIG. 5(B) shows an example of orientation of the projection plane in the case of the angle θ being 60 degrees.
FIG. 5(C) shows an example of orientation of the projection plane in the case of the angle θ being 30 degrees.
FIG. 5(D) shows an example of orientation of the projection plane in the case of the angle θ being 0 degree.
Figure 5:
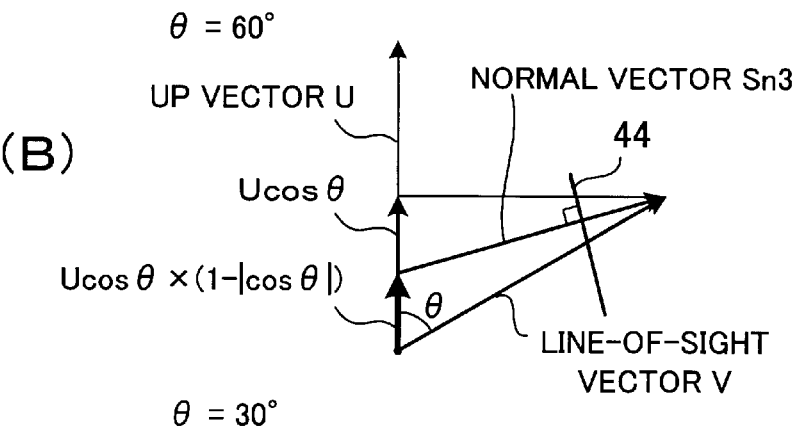
Figure 5:
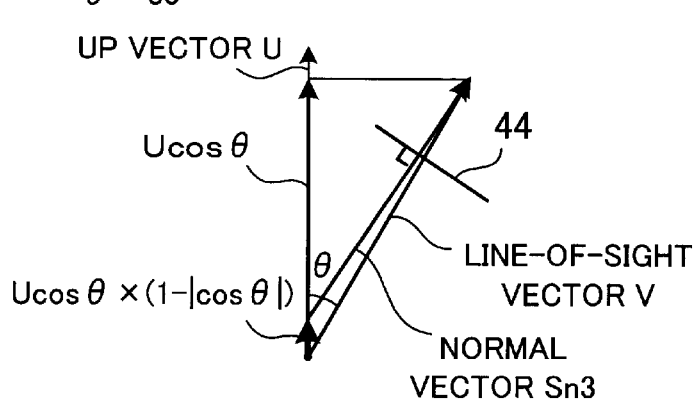
Figure 5:
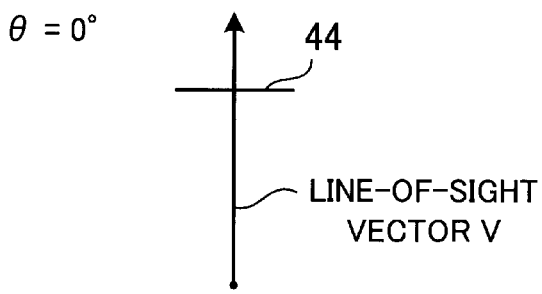

FIG. 5(A) shows a case of the angle $\theta$ indicative of transition of the direction of the projection plane normal used by walk perspective projection being 90 degrees, and FIG. 5(B) shows a case of the angle $\theta$ being 60 degrees. Further, FIG. 5(C) shows a case of the angle $\theta$ being 30 degrees, and FIG. 5(D) shows a case of the angle $\theta$ being 0 degree.

As shown in FIG. 5(A), when the angle $\theta$ is 90 degrees, the projection plane 44 is perpendicular to a horizontal plane within the virtual three-dimensional space (in this case, the normal vector Sn3 is parallel to the line-of-sight vector V).

When the line-of-sight vector V is directed slightly upward, and the angle $\theta$ becomes 60 degrees, the line-of-sight vector V and the normal vector Sn3 become nonparallel to each other as shown in FIG. 5(B). The normal vector Sn3 is directed less upward (more horizontally) than the line-of-sight vector V.

When the line-of-sight vector V is directed further upward, and the angle $\theta$ becomes 30 degrees, the difference in direction between the line-of-sight vector V and the normal vector Sn3 is reduced as shown in FIG. 5(C).

When the line-of-sight vector V is directed vertically, and the angle $\theta$ is reduced to 0 degree, the projection plane 44 is oriented horizontally as shown in FIG. 5(D). That is, the normal vector Sn3 of the projection plane 44 is directed vertically.

Figure 6:
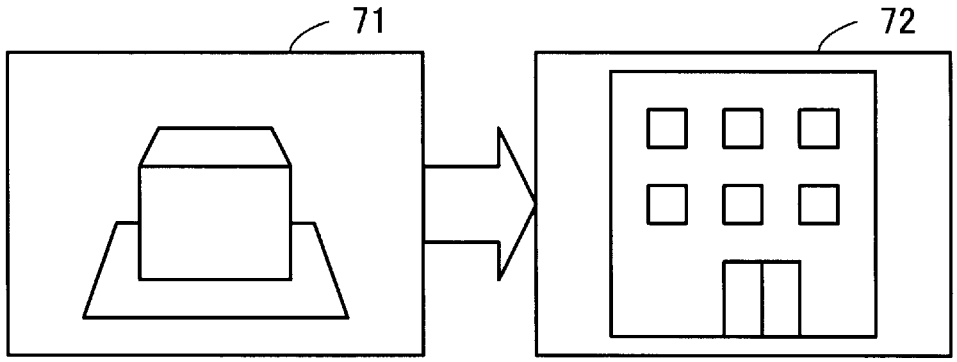
Figure 6:
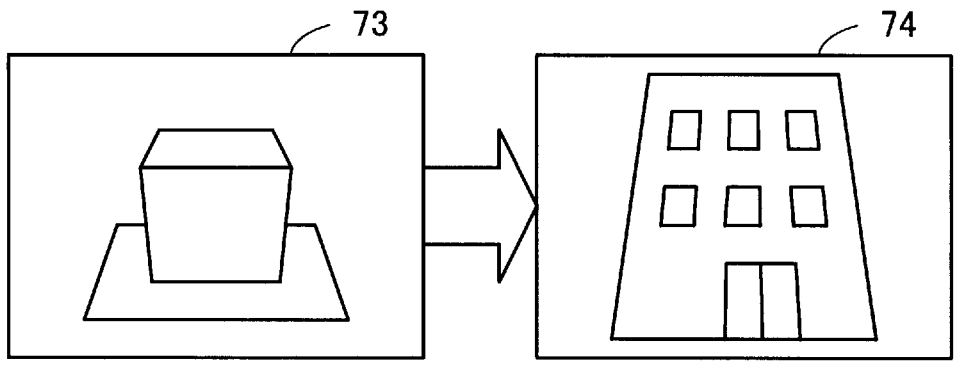
Figure 6:
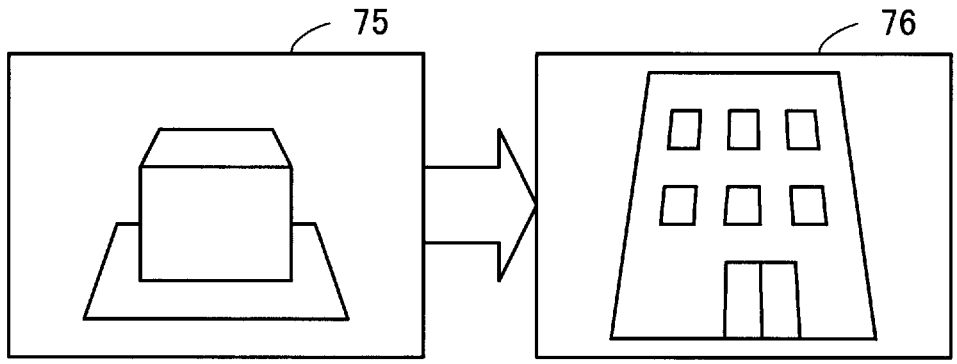

FIG. 6(A) shows projection images generated by two-point perspective projection, and FIG. 6(B) shows projection images generated by three-point perspective projection. Further, FIG. 6(C) shows projection images generated by walk perspective projection.

FIGS. 6(A) to 6(C) each show projection images formed by the corresponding projection method, one formed assuming that a viewer is moving while looking forward (in a state of the line-of-sight vector being directed slightly downward with respect to the horizontal direction) and another formed assuming that the viewer looks upward (in a state of the line-of-sight vector being directed upward), in a manner such that the projection methods can be distinguished from each other.

In two-point perspective projection, as shown in FIG. 6(A), line segments which are vertical in the virtual three-dimensional space are projected in parallel with each other not only in the projection image 71 formed assuming that the viewer looks forward, but also in the projection image 72 formed assuming that the viewer looks upward.

Since in two-point perspective projection, the line segments which are vertical in the virtual three-dimensional space are projected in parallel with each other even in the image as viewed in the upward direction as described above, a sense of the height of the image cannot be given sufficiently.

When three-point perspective projection is employed, in the projection image 73 formed assuming that the viewer looks forward, as shown in FIG. 6(B), the line segments which are vertical in the virtual three-dimensional space are projected such that extensions thereof converge to a vanishing point set far below. On the other hand, in the projection image 74 formed assuming that the viewer looks upward, the line segments which are vertical in the virtual three-dimensional space are projected such that extensions thereof converge to a vanishing point set far above.

As described above, in three-point perspective projection, even in the image as viewed in the forward direction, line segments which are vertical in the virtual three-dimensional space are formed such that extensions thereof converge to a vanishing point set far below. Therefore, in an image e.g. of a building as viewed from a viewpoint of a viewer moving forward while looking forward, pillars or the like of the building, which are vertical in the virtual three-dimensional space, look tilted and distorted, which makes the image look unnatural.

When walk perspective projection is employed, as shown in FIG. 6(C), in the projection image 75 formed assuming that the viewer looks forward, line segments which are vertical in the virtual three-dimensional space are projected in parallel with each other. On the other hand, in the projection image 76 formed assuming that the viewer looks upward, line segments which are vertical in the virtual three-dimensional space are formed such that extensions thereof converge to a vanishing point set far above.

According to walk perspective projection, in a real-time moving image sequence generated in response to user command, when the line-of-sight vector is directed forward, it is possible to suppress warpage or distortion of an image e.g. of a building, while when the line-of-sight vector is directed upward, the projection image can be formed such that it gives a sense of the height of the image of the building sufficiently.

Next, an example of the present embodiment realized by using a computer will be described in detail. The following example illustrates a system which is capable of moving a viewpoint in a virtual street line with houses and stores generated from three-dimensional models, in response to user command.

Figure 7:
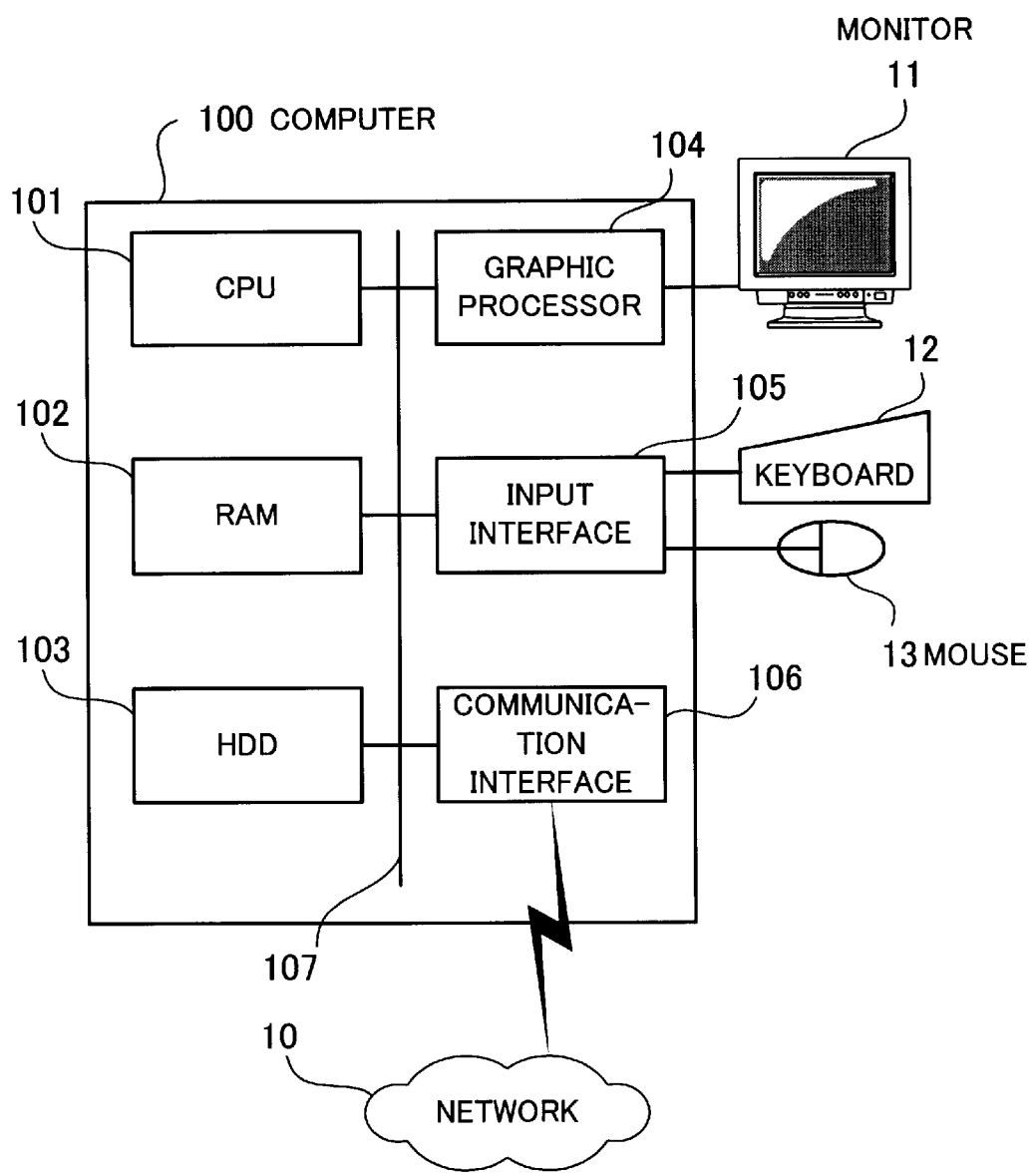
FIG. 7 is a block diagram showing a hardware configuration of a computer for implementing an embodiment of the present invention.

FIG. 7 shows the hardware configuration of the computer for realizing the present embodiment. The overall operation of the computer 100 is controlled by a CPU (Central Processing Unit) 101. Connected to the CPU 101 are a RAM (Random Access Memory) 102, a hard disk drive (HDD: Hard Disk Drive) 103, a graphic processor 104, an input interface 105 and a communication interface 106, via a bus 107.

The RAM 102 temporarily stores at least part of an OS (Operating System) program and one or more of application programs executed by the CPU 101. Further, the RAM 102 stores various kinds of data required for processing by the CPU 101. The HDD 103 stores the OS program and application programs.

A monitor 11 is connected to the graphic processor 104. The graphic processor 104 displays images on a screen of the monitor 11 in response to commands from the CPU 101. A keyboard 12 and a mouse 13 are connected to the input interface 105. The input interface 105 transfers signals from the keyboard 12 and the mouse 13 to the CPU 101 via the bus 107.

The communication interface 106 is connected to a network 10. The network 10 is a wide area network such as the Internet. The communication interface 106 exchanges data with other computers via the network 10.

Processing functions according to the present embodiment can be realized by the hardware constructed as above.

Figure 8:
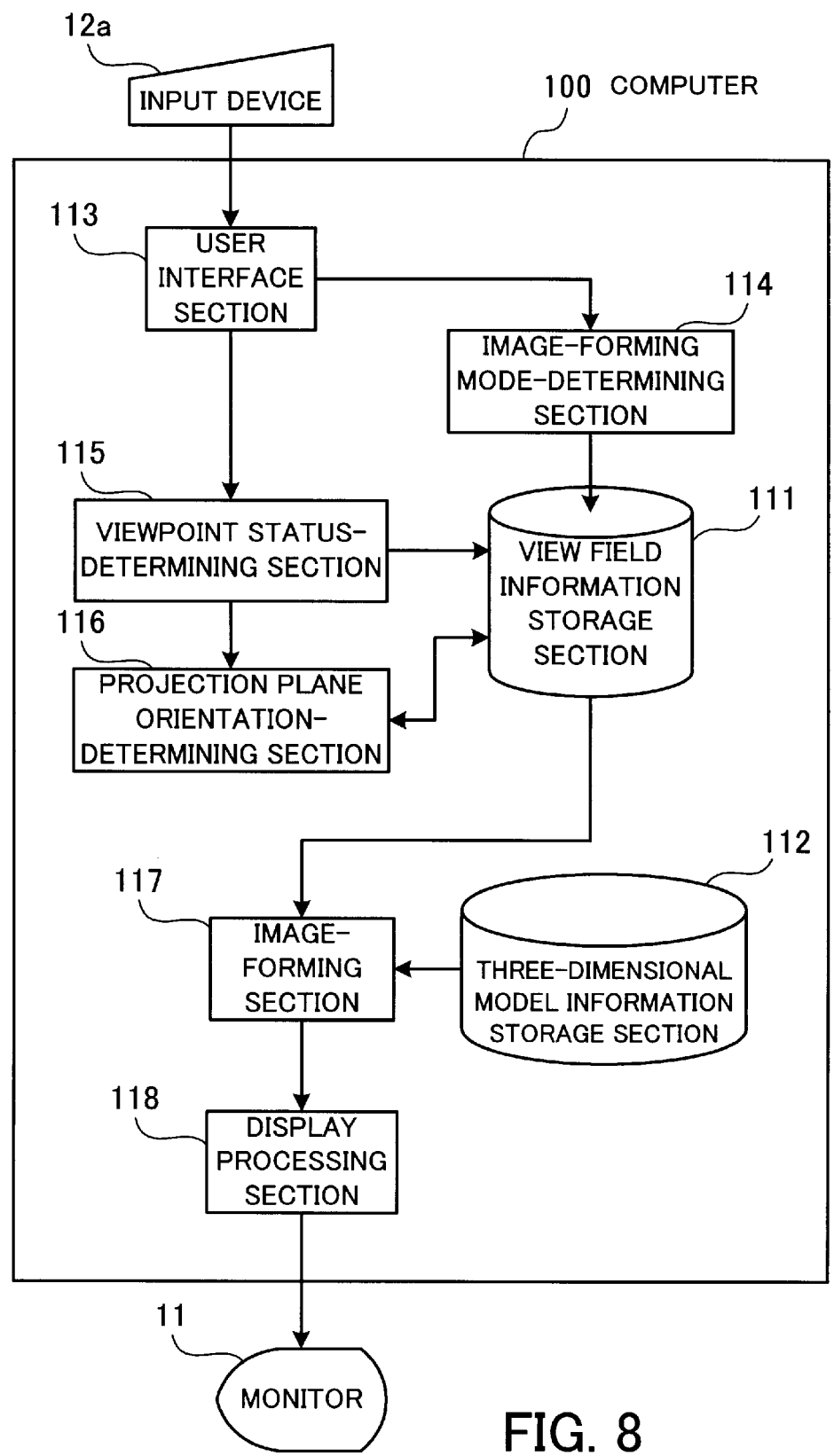
FIG. 8 is a block diagram showing the arrangement of functional sections realized by the computer to which is applied the embodiment.

FIG. 8 shows the arrangement of functional sections realized by the computer to which is applied the present embodiment. The computer 100 executes image-generating processing in response to an input from an input device 12a and displays a generated image on the monitor 11. The input device 12a includes the keyboard 12 and the mouse 13 appearing in FIG. 7.

The computer 100 is comprised of a view field information storage section 111, a three-dimensional model information storage section 112, a user interface section 113, an image-forming mode-determining section 114, a viewpoint status-determining section 115, a projection plane orientation-determining section 116, an image-forming section 117, and a display processing section 118.

The view field information storage section 111 stores information concerning viewpoints and projection planes (i.e. view field information). The view field information is updated whenever input by user's operation is carried out.

The three-dimensional model information storage section 112 stores information of shapes and colors of three-dimensional models (i.e. three-dimensional model information). In the present embodiment, an object formed by three-dimensionally disposed vertexes thereof is a three-dimensional model. In other words, a flat object, such as a polygon having no thickness, is also regarded as a three-dimensional model.

The user interface section 113 determines a command corresponding to an input signal from the input device 12a. When the command corresponding to an input signal from the input device 12a is for switching image-forming modes, the user interface section 113 delivers the command to the image-forming mode-determining section 114, while when the command corresponding to the input signal is a control command for controlling the viewpoint, the user interface section 113 delivers the control command to the viewpoint status-determining section 115.

The image-forming mode-determining section 114 determines an image-forming mode in response to the command from the user interface section 113. In the present embodiment, there are provided three image-forming modes, i.e. two-point perspective projection, three-point perspective projection and walk perspective projection. The image-forming mode-determining section 114 registers information of the determined image-forming mode in the view field information storage section 111.

The viewpoint status-determining section 115 determines viewpoint information in response to the control command delivered from the user interface section 113. Viewpoint information to be determined is information of a viewpoint position and a line-of-sight vector. The viewpoint status-determining section 115 stores the determined viewpoint information in the view field information storage section 111, and at the same time delivers information of the determined line-of-sight vector to the projection plane orientation-determining section 116.

The projection plane orientation-determining section 116 determines the normal vector of the projection plane according to the line-of-sight vector determined by the viewpoint status-determining section 115. Then, the projection plane orientation-determining section 116 stores the determined normal vector in the view field information storage section 111.

The image-forming section 117 perspectively projects or renders a three-dimensional model on the projection plane at predetermined time intervals (e.g. of $1/60$ seconds) based on the information stored in the view field information storage section 111 and the three-dimensional model information storage section 112, thereby forming a perspective image. Perspective images are continuously formed at the predetermined time intervals, whereby a moving image sequence is generated.

The display processing section 118 converts the perspective image formed by the image-forming section 117 to an image signal and transmits the same to the monitor 11.

FIG. 9 shows an example of the data structure of data stored in the view field information storage section. The view field information storage section 111 contains data or information of viewpoint coordinates E, a line-of-sight vector V, an up vector U, a distance from a viewpoint to a projection plane, a normal vector Sn of the projection plane, a window size and an image-forming mode.

The viewpoint coordinates E represent the position of the viewpoint by coordinates (Ex, Ey, Ez) in a virtual three-dimensional space. The viewpoint coordinates E are data which is updated according to an operation input by the user.

The line-of-sight vector V is a unit vector indicative of a direction (Vx, Vy, Vz) of viewing the inside of the virtual three-dimensional space from the viewpoint. The line-of-sight vector V is data which is updated according to an operation input by the user.

The up vector U is a unit vector defining an upward direction (Ux, Uy, Uz) from the viewpoint. The up vector U is preset. In the present embodiment, the up vector U is always directed vertically (in parallel with the z axis) within the virtual three-dimensional space. Therefore, Ux=Uy=0 holds.

The distance from the viewpoint to the projection plane is represented by distance "d" from the viewpoint coordinates to a reference point (e.g. the center of the projection plane). The distance from the viewpoint to the projection plane is preset.

The normal vector Sn of the projection plane is data indicative of a direction (Sx, Sy, Sz) of the normal of the projection plane. The normal vector Sn of the projection plane is data determined based on the line-of-sight vector V and the image-forming mode.

The window size is data indicative of the size (Wx, Wy) of the projection plane. The window size is preset.

The image-forming mode is data designating a method of perspective projection. In the present embodiment, it is possible to select any one of two-point perspective projection, three-point perspective projection and walk perspective projection as the image-forming mode.

FIG. 10 shows an example of the data structure of data stored in the three-dimensional model information storage section. The three-dimensional model information storage section 112 stores data or information of a shape and a color of each three-dimensional model.

The shape information includes information of vertex coordinates P, normal vectors N and faces.

The vertex coordinates P are coordinate points P1 (P1x, P1y, P1z), P2 (P2x, P2y, P2z), . . . of respective vertexes forming a three-dimensional model within the virtual three-dimensional space. The vertex coordinates P are registered in association with identifiers P1, P2, . . . for the respective vertexes. The normal vectors N represent normal directions N1 (N1x, N1y, N1z), N2 (N2x, N2y, N2z), . . . of the respective vertexes. The normal vectors N are registered in association with respective identifiers N1, N2, . . . . The normal vectors N are associated with the respective vertex coordinate points P.

The information of faces is a set of the vertexes of faces forming a three-dimensional model. The face information is registered for each of the faces. Each of the vertexes forming a face is identified by an identifier therefor. If a face is a quadrangle, four vertexes are registered, and if a face is a triangle, three vertexes are registered.

The information of color includes information of a model color, a translucency ratio, a color of a light source and a position L of the light source.

As for the model color, a color of the faces forming the three-dimensional model is designated by brightness (Mr, Mg, Mb) of each of RGB (red, green, blue) colors. Model colors may be set for respective faces of a three-dimensional model on a face-by-face basis.

The translucency ratio α of the model is designated by numeric values 0 to 1 each indicative of a degree of translucency of the three-dimensional model. The larger the value of the translucency ratio α is, the higher the degree of translucency of the three-dimensional model is. When the translucency ratio α is equal to 0, the three-dimensional model is opaque. On the other hand, when the translucency ratio α is equal to 1, the three-dimensional model is transparent.

As for the light source color, a color of light emitted by the light source is represented by brightness (Lr, Lg, Lb) of each of RGB (red, green, blue) colors.

The position L of the light source is coordinates (Lx, Ly, Lz) indicative of the position of the light source within the virtual three-dimensional space.

A projection condition is determined based on the information shown in FIGS. 9 and 10.

Figure 11:
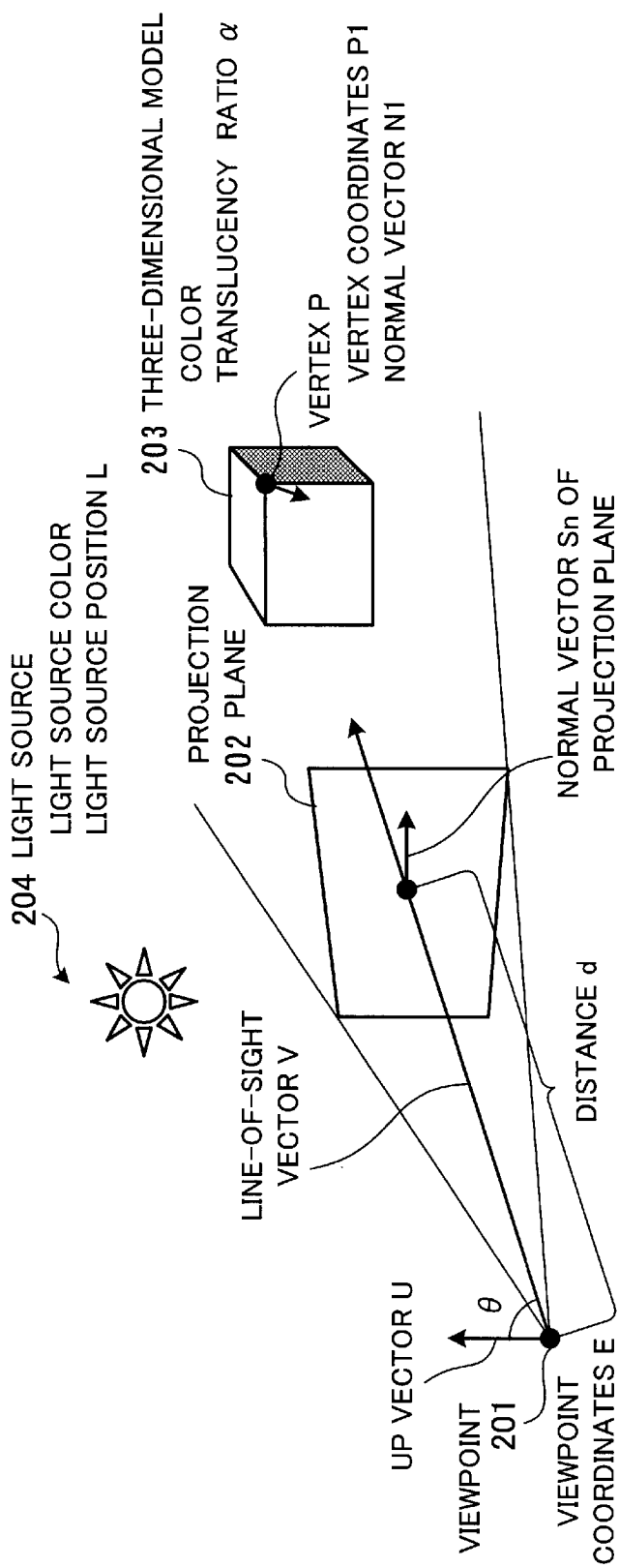
FIG. 11 is a conceptual representation schematically showing three-dimensional perspective projection.

FIG. 11 schematically shows the concept of three-dimensional perspective projection. Within a virtual three-dimensional space, there are defined a viewpoint 201, a projection plane 202, a three-dimensional model 203 and a light source 204. Viewpoint coordinates E and a line-of-sight vector V are defined with respect to the viewpoint 201. A normal vector Sn of the projection plane and the like are defined with respect to the projection plane 202. Defined with respect to the three-dimensional model 203 are a model color, a translucency ratio α, and vertex coordinates P1 and a normal vector N1 of a vertex P, and so forth. A light source position L and a light source color are defined with respect to a light source 204.

When the user carries out the operation input to the computer 100 having the above-described functions and the information set as above, a perspective projection is performed according to the operation input, whereby a scene (e.g. a row of stores and houses on a street) generated within the virtual three-dimensional space is displayed. The procedure for displaying an image will be described below.

Figure 12:
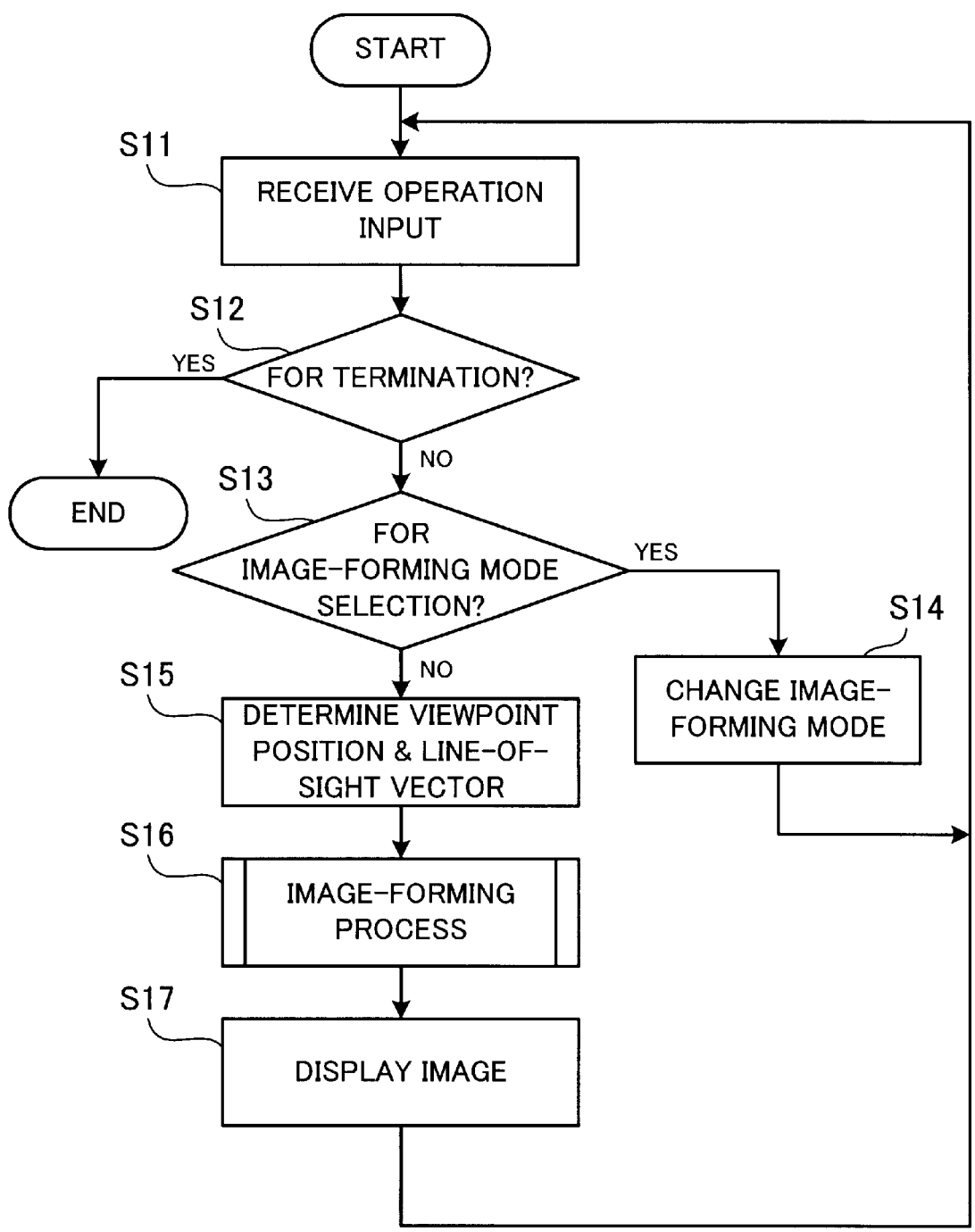
FIG. 12 is a flowchart showing a routine for carrying out an image display process by walkthrough according to the embodiment of the invention.

FIG. 12 shows a routine for carrying out an image display process by walkthrough to which the present embodiment is applied. In the following, the program for carrying out the process shown in FIG. 12 is explained following a sequence of steps.

[S11] The user interface section 113 receives an operation input from the user via the input device 12a.

[S12] The user interface section 113 determines whether or not the operation input has been performed for terminating the process. If the operation input has been performed for terminating the process, the process is terminated. If the operation input has not been performed for terminating the process, the program proceeds to a step S13.

[S13] The user interface section 113 determines whether or not the operation input is a command for selecting an image-forming mode. It should be noted that the other command which can be issued by an operation input is a viewpoint status control command.

If the operation input is a command for selecting an image-forming mode, the command is delivered from the user interface section 113 to the image-forming mode-determining section 114, followed by the program proceeding to a step S14. On the other hand, if the operation input is not a command for selecting an image-forming mode but a viewpoint status control command, the control command is delivered from the user interface section 113 to the viewpoint status-determining section 115, followed by the program proceeding to a step S15.

[S14] The image-forming mode-determining section 114 switches the image-forming mode from one perspective projection to another in response to the command received from the user interface section 113. The result of the mode change is registered in the view field information storage section 111, followed by the program returning to the step S11.

[S15] The viewpoint status-determining section 115 determines the viewpoint position and the line-of-sight vector in response to the viewpoint status control command delivered from the user interface section 113. The determined viewpoint position and line-of-sight vector are registered in the view field information storage section 111. At the same time, the determined line-of-sight vector is delivered to the projection plane orientation-determining section 116.

[S16] An image-forming process is performed by the projection plane orientation-determining section 116 and the image-forming section 117. The image-forming process will be described in detail hereinbelow. The image-forming process is repeatedly carried out at predetermined time intervals even if there is no operation input from the user.

[S17] The display processing section 118 displays an image formed by the image-forming section 117 on the screen of the monitor 11. Images generated continuously are sequentially displayed on the monitor 11, whereby a moving image sequence is displayed on the monitor 11. Then, the program returns to the step S11.

Next, the image-forming process will be described in detail.

Figure 13:
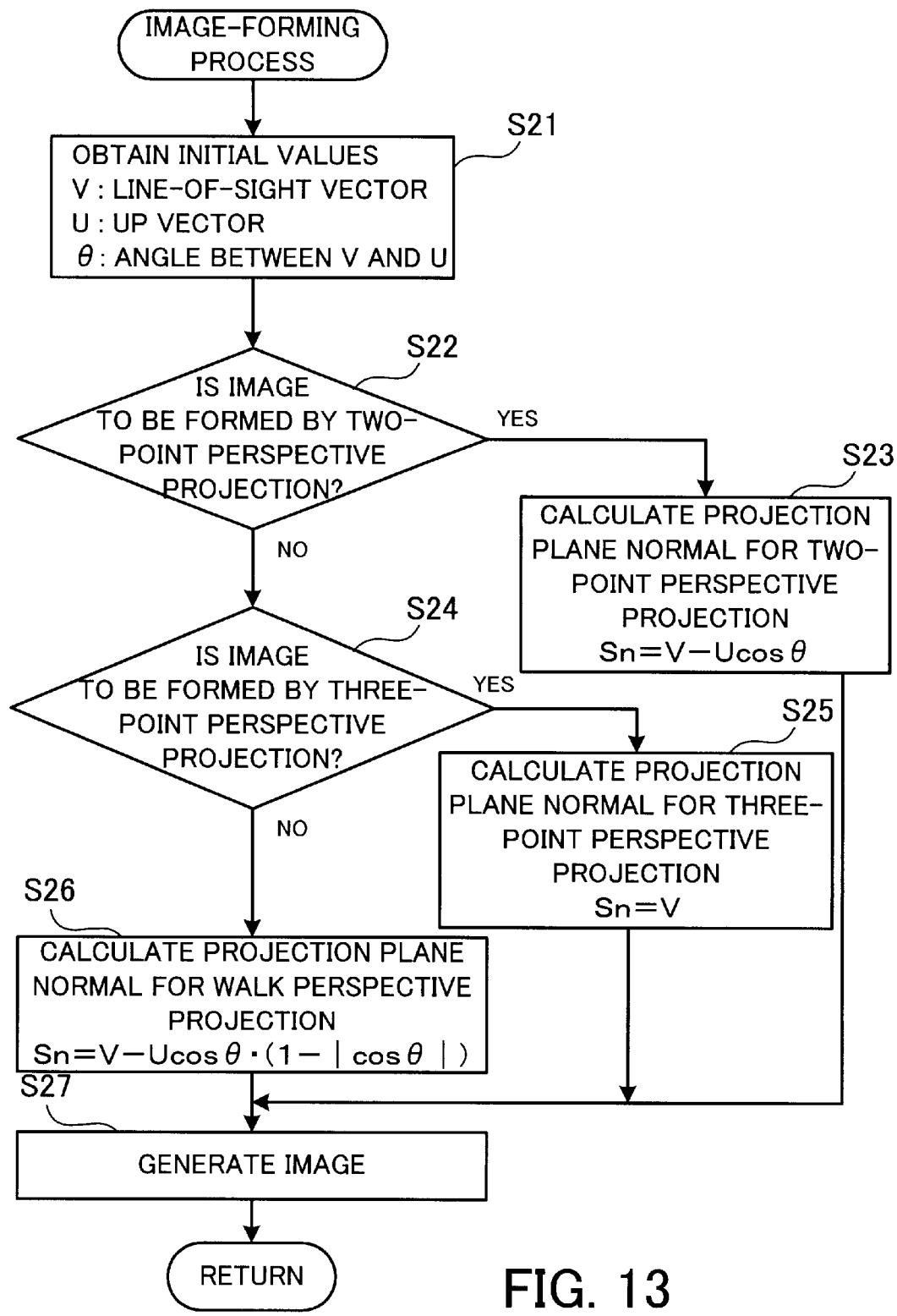
FIG. 13 is a flowchart showing a routine for carrying out an image-forming process.

FIG. 13 shows a routine for carrying out the image-forming process. In the following, the program for carrying out the image-forming process is explained following a sequence of steps.

[S21] The projection plane orientation-determining section 116 obtains initial values of the view field information. The initial values of the view field information include, for example, the line-of-sight vector V, the up vector U, and the angle θ between the line-of-sight vector V and the up vector U. The line-of-sight vector V and the up vector U among the initial values of the view field information are obtained from the view field information storage section 111. The angle θ is calculated e.g. based on an inner product between the line-of-sight vector V and the up vector U.

In the present embodiment, the normal vector of the projection plane is calculated by using cos θ, and hence cos θ may be calculated as an initial value in place of the angle θ.

[S22] The projection plane orientation-determining section 116 determines, with reference to data stored in the view field information storage section 111, whether or not the image-forming mode has been set to two-point perspective projection. If the image-forming mode has been set to two-point perspective projection, the program proceeds to a step S23, whereas if not, the program proceeds to a step S24.

[S23] The projection plane orientation-determining section 116 calculates the normal vector Sn of the projection plane for two-point perspective projection. More specifically, the normal vector Sn of the projection plane is calculated by the aforementioned equation (1). Then, the program proceeds to a step S27.

[S24] The projection plane orientation-determining section 116 determines, with reference to the view field information storage section 111, whether or not the image-forming mode has been set to three-point perspective projection. If the image-forming mode has been set to three-point perspective projection, the program proceeds to a step S25, whereas if not (i.e. if the image-forming mode has been set to walk perspective projection), the program proceeds to a step S26.

[S25] The projection plane orientation-determining section 116 calculates the normal vector Sn of the projection plane for three-point perspective projection. More specifically, the normal vector Sn2 of the projection plane is calculated by the aforementioned equation (2). Then, the program proceeds to the step S27.

[S26] The projection plane orientation-determining section 116 calculates the normal vector Sn of the projection plane for walk perspective projection. More specifically, the normal vector Sn3 of the projection plane is calculated by the aforementioned equation (3).

[S27] The image-forming section 117 obtains information concerning the view field from the view field information storage section 111, and at the same time obtains information of the three-dimensional model within the virtual three-dimensional space from the three-dimensional model information storage section 112. Then, the image-forming section 117 perspectively projects the three-dimensional model onto the projection plane oriented according to the normal vector Sn determined by the projection plane orientation-determining section 116, to thereby generate an image. The generated image is formed e.g. in a frame buffer, not shown, contained in the graphic processor 104 appearing in FIG. 7.

Then, the program proceeds to the step S17 in FIG. 12, wherein the generated image is displayed on the monitor 11.

Thus, a frame of the moving image sequence of the row of stores and houses on the street within the virtual three-dimensional space can be displayed on the monitor 11 of the computer 100 by using any one of two-point perspective projection, three-point perspective projection and walk perspective projection. In the following, examples of display frames are described on a projection method-by-projection method basis.

Figure 14:
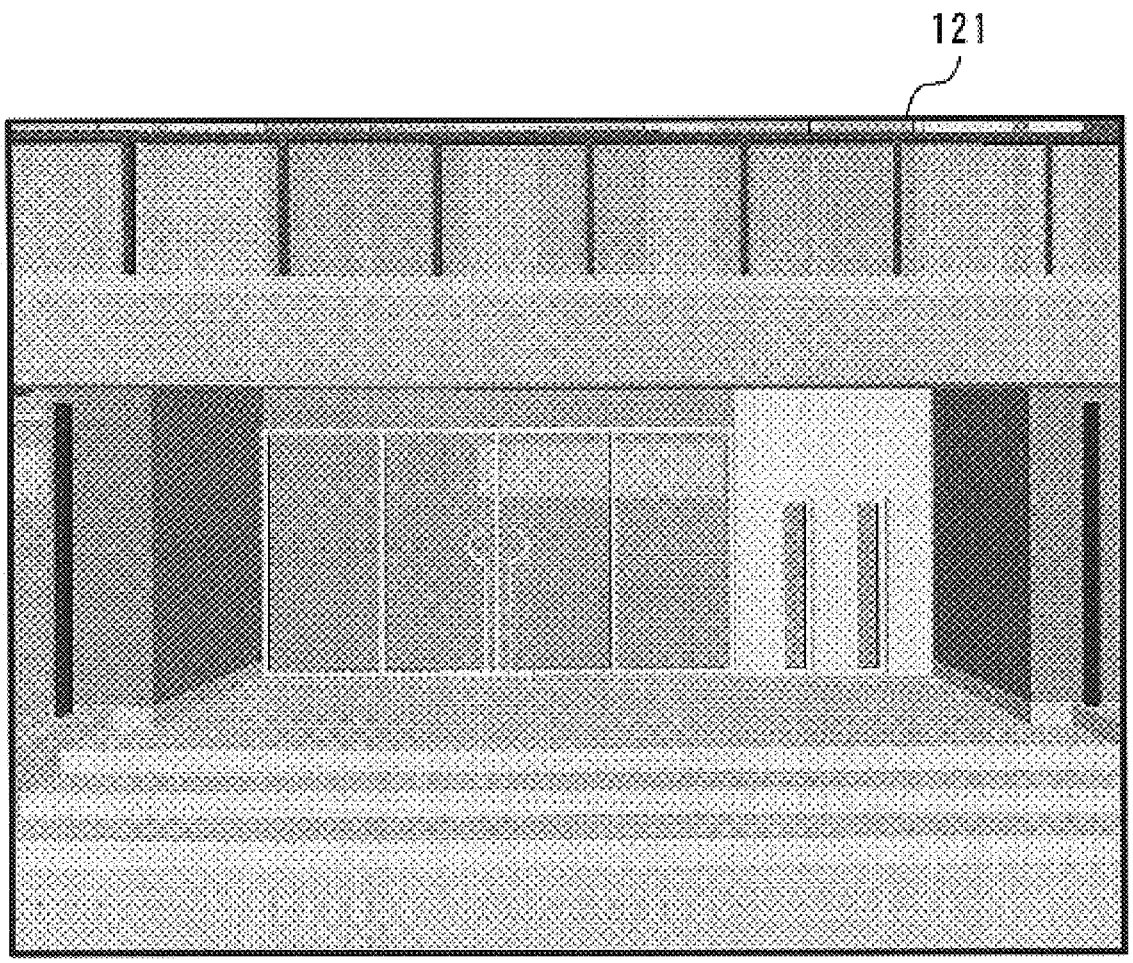
FIG. 14 shows a first example of a frame by two-point perspective projection.
Figure 15:
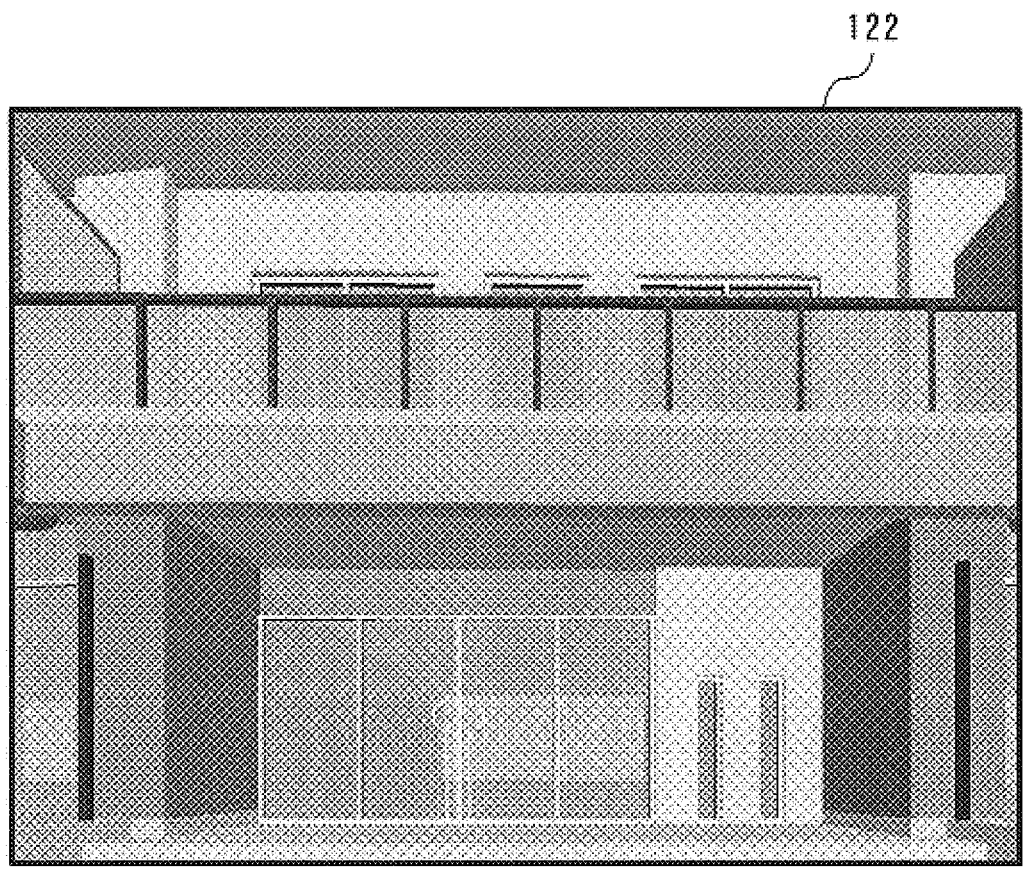
FIG. 15 shows a second example of a frame by two-point perspective projection.
Figure 16:
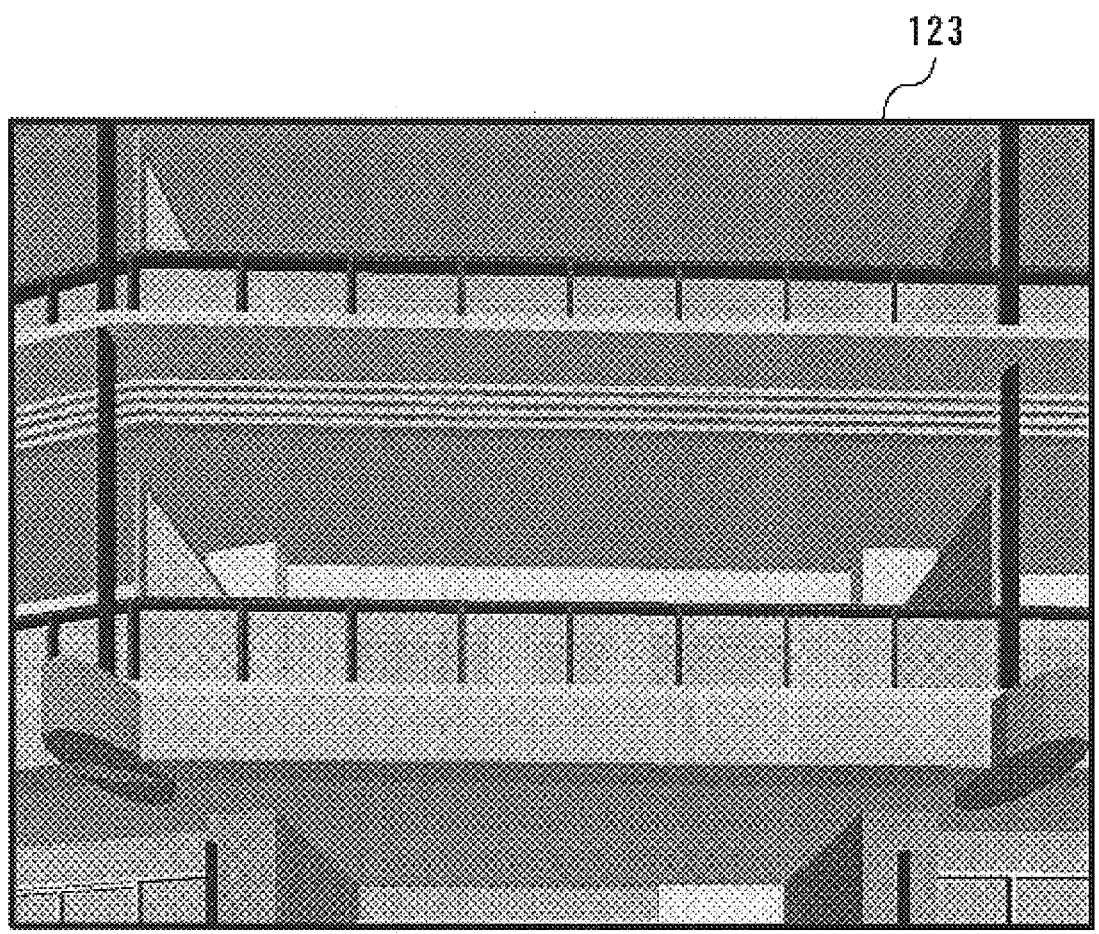
FIG. 16 shows a third example of a frame by two-point perspective projection.

FIGS. 14 to 16 show examples of display frames of images formed by two-point perspective projection.

FIG. 14 shows an example of a first display frame according to two-point perspective projection. The FIG. 14 frame 121 is one showing an image of a front entrance of a building formed by two-point perspective projection. The line-of-sight vector is directed slightly downward with respect to a horizontal one.

FIG. 15 shows an example of a second display frame according to two-point perspective projection. The FIG. 15 frame 122 is one formed with the line-of-sight vector turned upward from the FIG. 14 state.

FIG. 16 shows an example of a third display frame according to two-point perspective projection. The FIG. 16 frame 123 is one formed with the line-of-sight vector turned further upward from the FIG. 15 state.

In two-point perspective projection, as shown in FIGS. 14 to 16, vertical objects, such as pillars of the building, within a virtual three-dimensional space are formed in parallel with each other in a vertical direction as viewed in the frames 121 to 123, irrespective of the direction of the line-of-sight vector.

Figure 17:
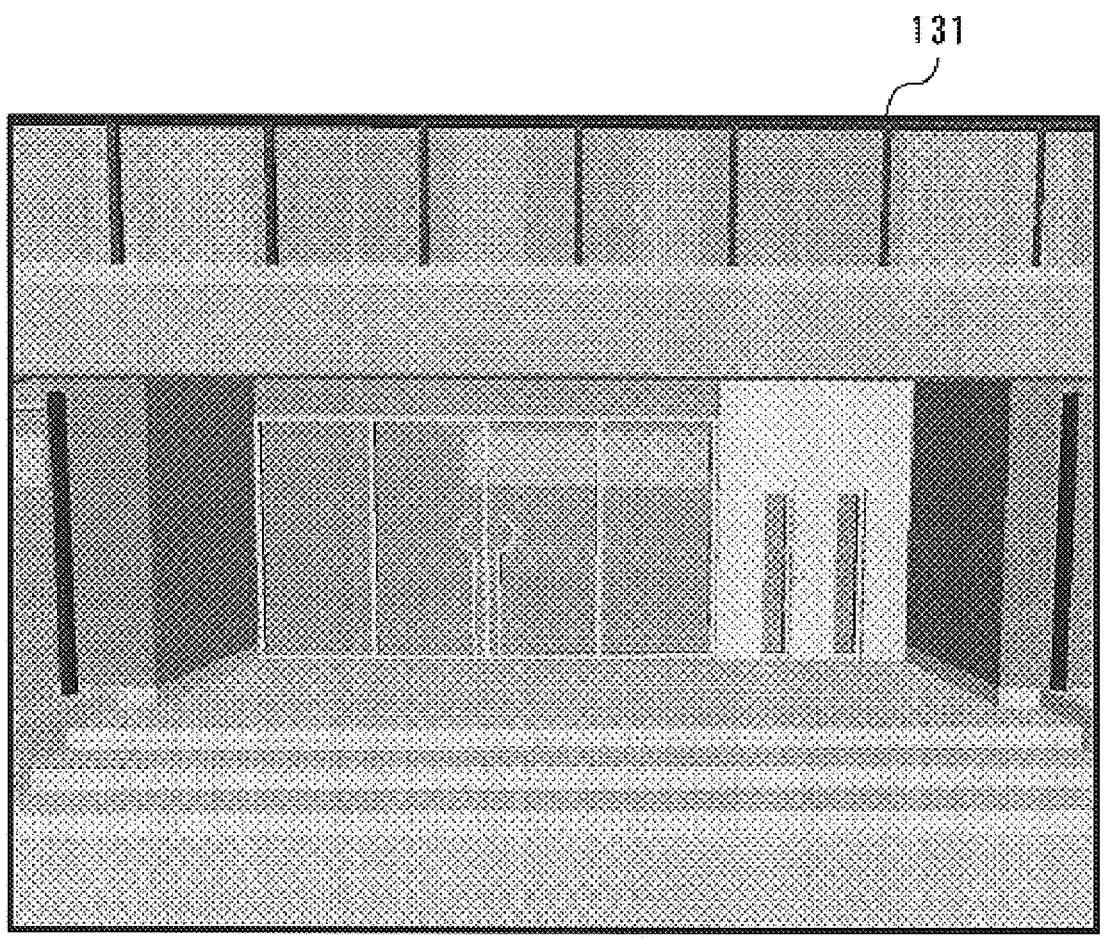
FIG. 17 shows a first example of a frame by three-point perspective projection.
Figure 18:
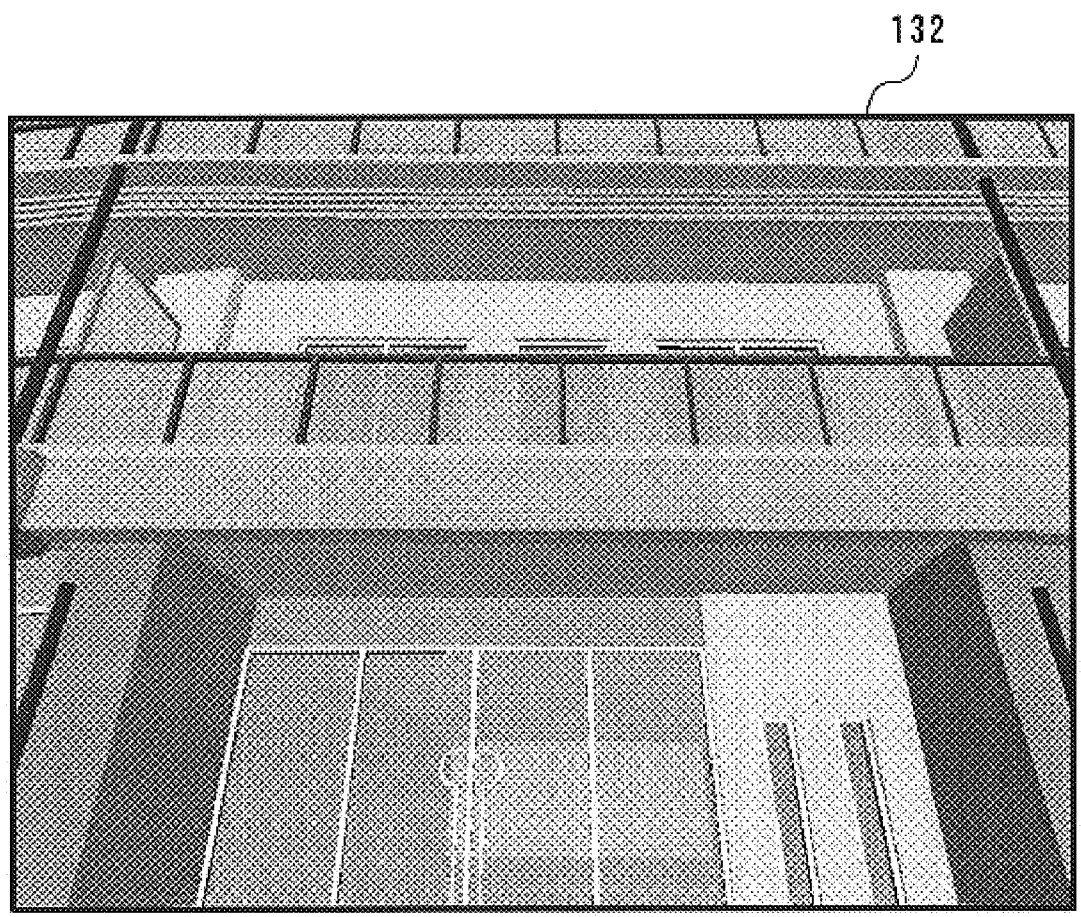
FIG. 18 shows a second example of a frame by three-point perspective projection.
Figure 19:
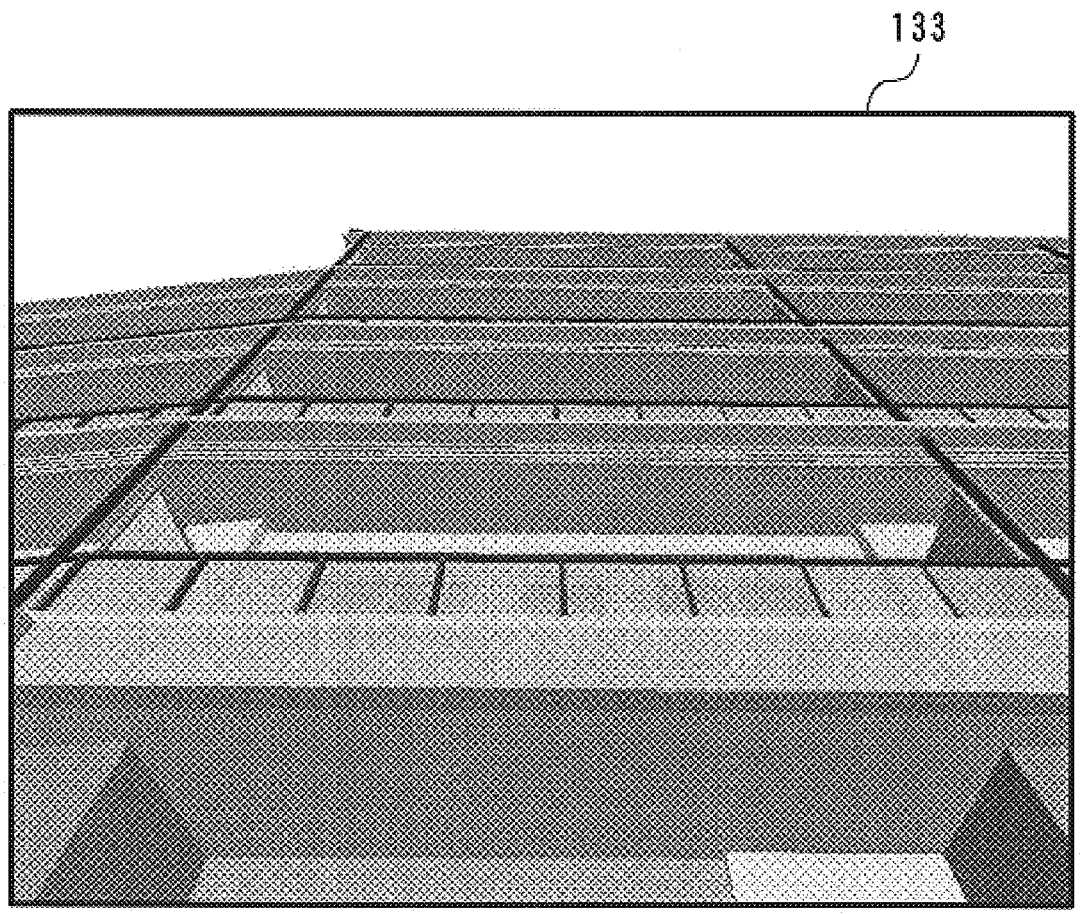
FIG. 19 shows a third example of a frame by three-point perspective projection.

FIGS. 17 to 19 show examples of display frames of images formed by three-point perspective projection.

FIG. 17 shows an example of a first display frame according to three-point perspective projection. The FIG. 17 frame 131 is one showing an image of the front entrance of the building formed by three-point perspective projection. The line-of-sight vector is directed slightly downward with respect to a horizontal one (i.e. identical to the line-of-sight vector in FIG. 14).

FIG. 18 shows an example of a second display frame according to three-point perspective projection. The FIG. 18 frame 132 is one formed with the line-of-sight vector turned upward from the FIG. 17 state (i.e. identical to the line-of-sight vector in FIG. 15).

FIG. 19 shows an example of a third display frame according to three-point perspective projection. The FIG. 19 frame 133 is one formed with the line-of-sight vector turned further upward from the FIG. 18 state (i.e. identical to the line-of-sight vector in FIG. 16).

In three-point perspective projection, as shown in FIGS. 17 to 19, the vertical objects, such as the pillars of the building, within the virtual three-dimensional space are formed such that extensions thereof converge to a vanishing point set far above or below in a vertical direction as viewed in the frames 131 to 133, irrespective of the direction of the line-of-sight vector. Therefore, when the line-of-sight vector is turned upward as shown in FIG. 19, the frame 133 giving a sense of height is displayed, whereas even when the view direction is turned slightly downward, the objects within the frame 131 are distorted as shown in FIG. 17.

Figure 20:
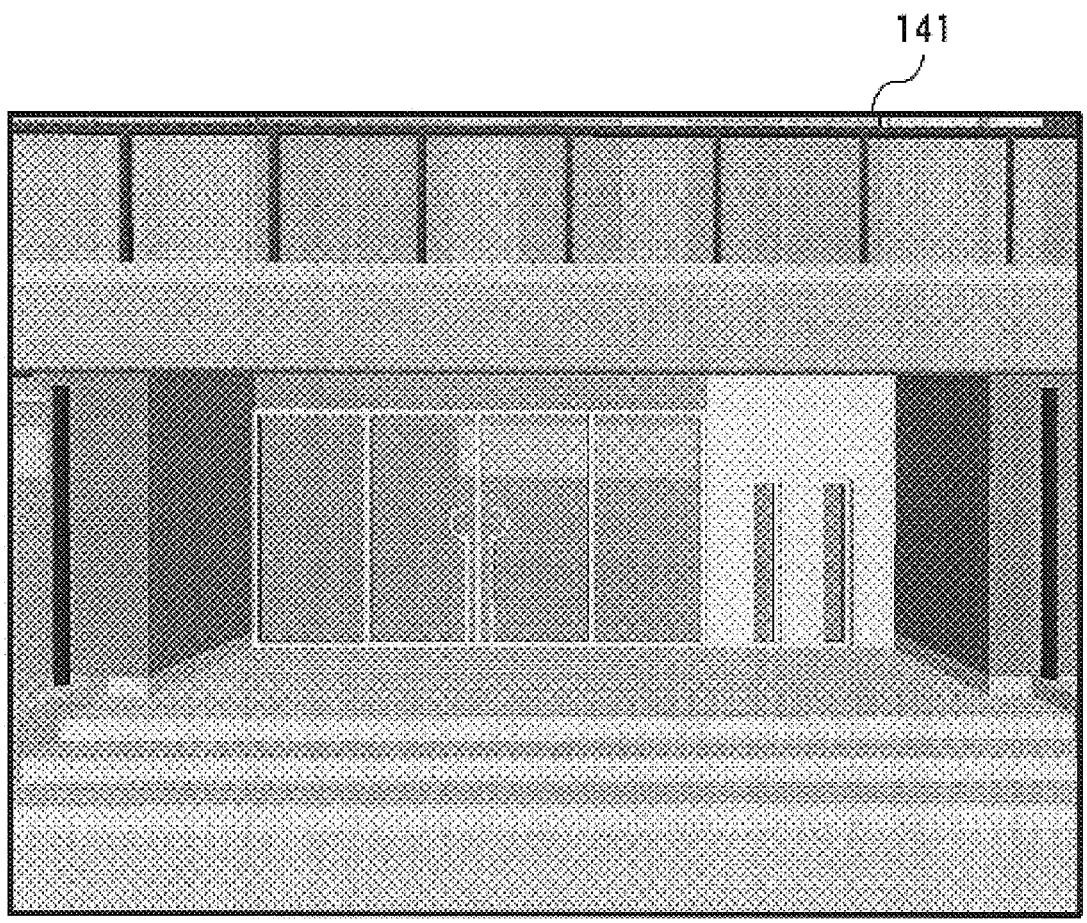
FIG. 20 shows a first example of a frame by walk perspective projection.
Figure 21:
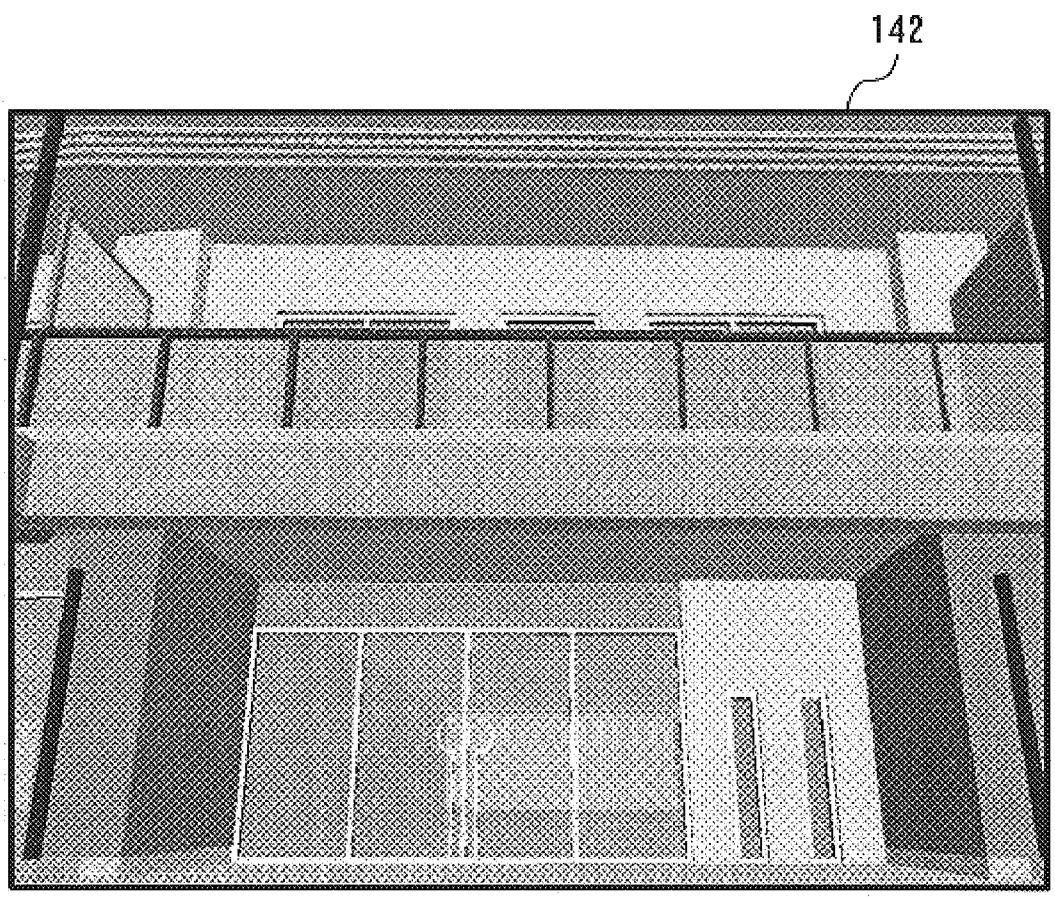
FIG. 21 shows a second example of a frame by walk perspective projection.
Figure 22:
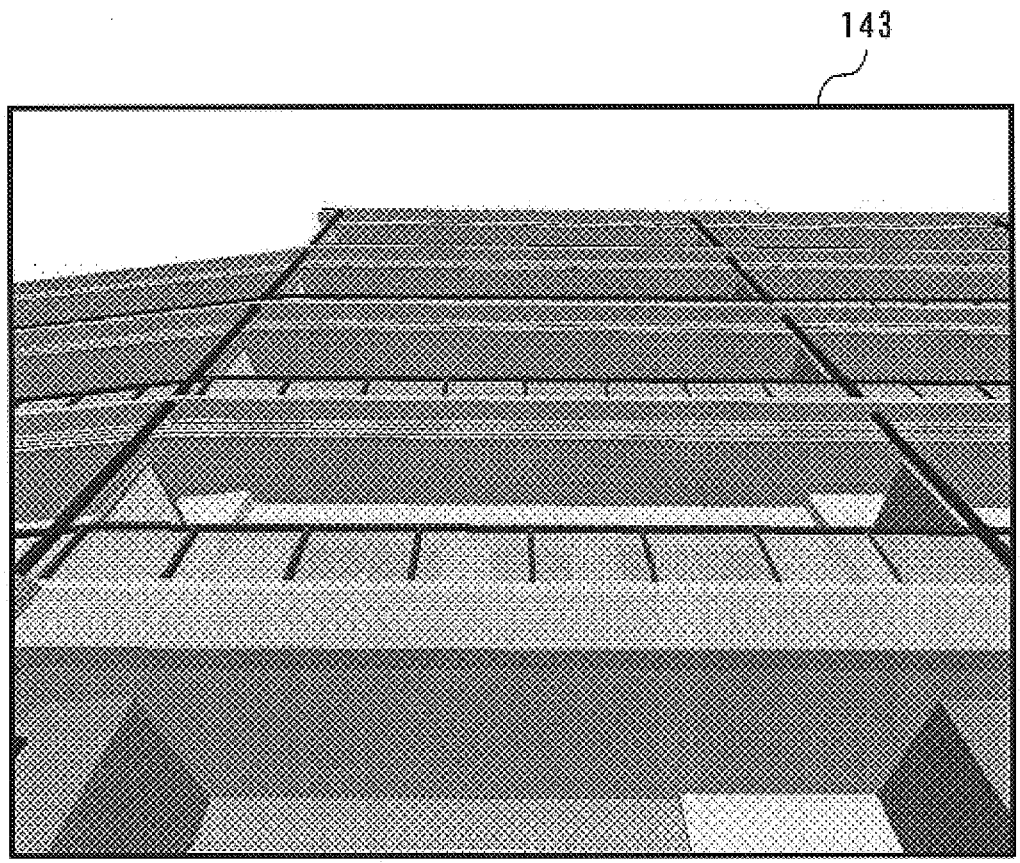
FIG. 22 shows a third example of a frame by walk perspective projection.
Figure 23:
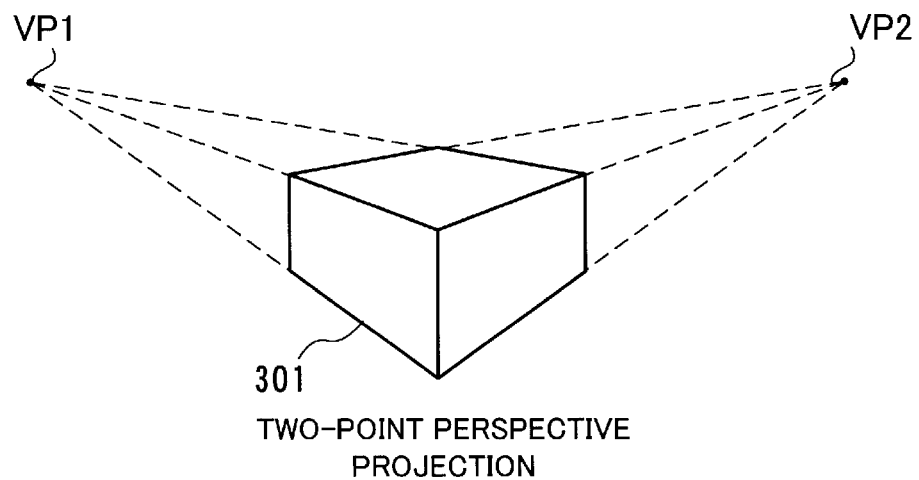
Figure 23:
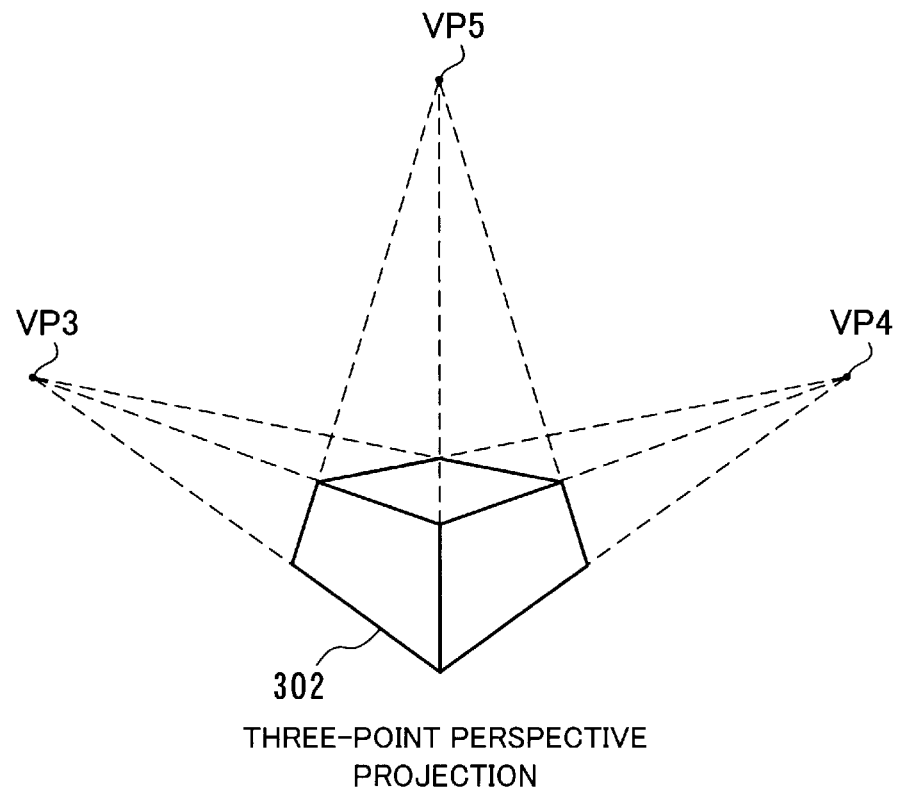

FIGS. 20 to 22 show examples of display frames of images formed by walk perspective projection.

FIG. 20 shows an example of a first display frame according to walk perspective projection. The FIG. 20 frame 141 is one showing an image of the front entrance of the building formed by walk perspective projection. The line-of-sight vector is directed slightly downward with respect to a horizontal one (i.e. identical to the line-of-sight vector in FIG. 14).

FIG. 21 shows an example of a second display frame according to walk perspective projection. The FIG. 21 frame 142 is one formed with the line-of-sight vector turned upward from the FIG. 20 state (i.e. identical to the line-of-sight vector in FIG. 15).

FIG. 22 shows an example of a third display frame according to walk perspective projection. The FIG. 22 frame 143 is one formed with the line-of-sight vector turned further upward from the FIG. 21 state (i.e. identical to the line-of-sight vector in FIG. 16).

In walk perspective projection, as shown in FIGS. 20 to 22, when the line-of-sight vector is directed substantially horizontally, the orderly frame 141 (approximate to the frame 121 by two-point perspective projection) with very little distortion of the objects is displayed, while when the line-of-sight vector is turned upward, the frame 143 (approximate to the frame 133 by three-point perspective projection) giving a sense of height is displayed.

In addition, by changing the value of the walk term of the equation (3) for use in calculating the normal vector Sn3 of the projection plane, it is possible to change the image-forming mode gently from two-point perspective projection to three-point perspective projection. This enables natural transition between frames when the direction of the line-of-sight vector is changed in respect of the vertical direction.

It should be noted that the walk term of the equation (3) can be replaced with any other suitable function which changes smoothly according to the value of the angle θ.

Although in the above embodiment, processing for displaying a moving image sequence is described, the present invention is applicable to images other than moving ones, and even when a still image is dealt with, the invention provides the same effects as obtained by the above embodiment.

Further, the above processing capabilities can be implemented by a computer. In this case, details of processing which can be executed by functions of the computer are written in a program stored in a computer-readable recording medium, and the processing capabilities are realized by executing the program on the computer. The computer-readable recording media include a magnetic recording device, an optical disk, a magneto-optical recording medium and a semiconductor memory. The magnetic recording device may be a hard disk drive (HDD), a flexible disk (FD), a magnetic tape, or the like. The optical disk may be a DVD (Digital Versatile Disk), a DVD-RAM (Random Access Memory), a CD-ROM (Compact Disk Read Only Memory), a CD-R (Recordable)/RW (ReWritable), or the like. Further, the magneto-optical recording medium may be an MO (Magneto-Optical disk) or the like.

To make this program available on the market, it can be stored in a portable recording medium, such as a DVD or CD-ROM. Further, the program can be stored in a storage device of a server computer connected to a network, and transferred from the server computer to other computers via the network.

When the program is executed on a computer, the program stored in a portable recording medium or transferred from the server computer is stored into a storage device of the computer. The computer reads the program from the storage device of its own and executes processing based on the program. The computer can also read the program directly from the portable recording medium and executes processing based on the program. Further, whenever a program is transferred from the server computer, the computer can execute processing based on the received program.

As described above, in the present invention, the degree of influence of three-point perspective projection on two-point perspective projection is changed according to the degree of inclination of a line-of-sight vector with respect to the horizontal direction. This makes it possible to effect smooth transition of a moving image viewed from the viewpoint in a virtual three-dimensional space from one formed by two-point perspective projection to one formed by three-point perspective projection. As a result, a sense of lateral expansion of an image as viewed in the horizontal direction from the viewpoint and a sense of height of an image as viewed in an upward direction can be given in a moving image sequence.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A three-dimensional model display program for displaying a three-dimensional model defined within a virtual three-dimensional space,
    the program causing a computer to execute the processes of:
        determining a line-of-sight vector indicative of a direction of viewing an inside of the virtual three-dimensional space from a viewpoint, in response to an operation input;
        determining a projection condition that two-point perspective projection is selected when the line-of-sight vector is close to a horizontal one, and a degree of influence of three-point perspective projection on two-point perspective projection increases with an increase in inclination of the line-of-sight vector with respect to a horizontal direction;
        generating an image by perspectively projecting the three-dimensional model according to the determined projection condition; and
        displaying the generated image.

2. The three-dimensional model display program according to claim 1, wherein in determining the projection condition, a direction of a normal of a projection plane is determined according to a direction of the determined line-of-sight vector.

3. The three-dimensional model display program according to claim 2, wherein in determining the projection condition, an adjustment vector having a length set according to the direction of the line-of-sight vector and at the same time directed vertically within the virtual three-dimensional space is calculated, and the direction of the normal of the projection plane is set to a direction of a vector obtained by subtracting the adjustment vector from the line-of-sight vector.

4. The three-dimensional model display program according to claim 3, wherein in calculating the adjustment vector, a vertical vector having the same length as a vertical component of the line-of-sight vector and at the same time directed vertically within the virtual three-dimensional space is calculated, and then the vertical vector is multiplied by a walk term having a value set according to the direction of the line-of-sight vector, to thereby obtain the adjustment vector.

5. The three-dimensional model display program according to claim 4, wherein in calculating the adjustment vector, when the line-of-sight vector is the horizontal one, the walk term is set to 0, and the walk term is set to a larger value with the increase in the inclination of the line-of-sight vector with respect to the horizontal direction, with the walk term being set to 1 when the line-of-sight vector is a vertical one.

6. A three-dimensional model display apparatus for displaying a three-dimensional model defined within a virtual three-dimensional space,
the apparatus comprising:
viewpoint status-determining means for determining a line-of-sight vector indicative of a direction of viewing an inside of the virtual three-dimensional space from a viewpoint, in response to an operation input;
projection condition-determining means for determining a projection condition that two-point perspective projection is selected when the line-of-sight vector determined by the viewpoint status-determining means is close to a horizontal one and a degree of influence of three-point perspective projection on two-point perspective projection increases with an increase in inclination of the line-of-sight vector with respect to a horizontal direction;
image-generating means for generating an image by perspectively projecting the three-dimensional model according to the projection condition determined by the projection condition-determining means; and
image display means for displaying the generated image.

7. The three-dimensional model display apparatus according to claim 6, wherein the projection condition-determining means determines a direction of a normal of a projection plane according to a direction of the determined line-of-sight vector.

8. The three-dimensional model display apparatus according to claim 7, wherein the projection condition-determining means calculates an adjustment vector having a length set according to the direction of the line-of-sight vector and at the same time directed vertically within the virtual three-dimensional space and then sets the direction of the normal of the projection plane to a direction of a vector obtained by subtracting the adjustment vector from the line-of-sight vector.

9. The three-dimensional model display apparatus according to claim 8, wherein the projection condition-determining means calculates a vertical vector having the same length as a vertical component of the line-of-sight vector and at the same time directed vertically within the virtual three-dimensional space and then multiplies the vertical vector by a walk term having a value set according to the direction of the line-of-sight vector, to thereby obtain the adjustment vector.

10. The three-dimensional model display apparatus according to claim 9, wherein the projection condition-determining means sets the walk term to 0 when the line-of-sight vector is the horizontal one, and sets the walk term to a larger value with the increase in the inclination of the line-of-sight vector with respect to the horizontal direction, with the walk term being set to 1 when the line-of-sight vector is a vertical one.

11. A computer-readable recording medium storing a three-dimensional model display program for displaying a three-dimensional model defined within a virtual three-dimensional space,
the recording medium causing a computer to execute the processes of:
determining a line-of-sight vector indicative of a direction of viewing an inside of the virtual three-dimensional space from a viewpoint, in response to an operation input;
determining a projection condition that two-point perspective projection is selected when the line-of-sight vector is close to a horizontal one, and a degree of influence of three-point perspective projection on two-point perspective projection increases with an increase in inclination of the line-of-sight vector with respect to a horizontal direction;
generating an image by perspectively projecting the three-dimensional model according to the determined projection condition; and
displaying the generated image.

12. A three-dimensional model display method for displaying a three-dimensional model defined within a virtual three-dimensional space,
the method comprising the steps of:
determining a line-of-sight vector indicative of a direction of viewing an inside of the virtual three-dimensional space from a viewpoint, in response to an operation input;
determining a projection condition that two-point perspective projection is selected when the line-of-sight vector is close to a horizontal one, and a degree of influence of three-point perspective projection on two-point perspective projection increases with an increase in inclination of the line-of-sight vector with respect to a horizontal direction;
generating an image by perspectively projecting the three-dimensional model according to the determined projection condition; and
displaying the generated image.

* * * * *